US006791716B1

(12) United States Patent
Buhr et al.

(10) Patent No.: US 6,791,716 B1
(45) Date of Patent: Sep. 14, 2004

(54) COLOR IMAGE REPRODUCTION OF SCENES WITH PREFERENTIAL COLOR MAPPING

(75) Inventors: John D. Buhr, Fairport, NY (US); Karin Topfer, Rochester, NY (US)

(73) Assignee: Eastmas Kodak Company, Rochester, NY (US)

( * ) Notice: Subject to any disclaimer, the term of this patent is extended or adjusted under 35 U.S.C. 154(b) by 0 days.

(21) Appl. No.: 09/506,712

(22) Filed: Feb. 18, 2000

(51) Int. Cl.[7] .............................. G06F 3/12; G06K 15/02
(52) U.S. Cl. ...................... 358/1.9; 358/518; 358/520; 382/162; 382/167
(58) Field of Search ...................... 358/1.9, 518, 520, 358/162, 167; 345/600; 355/88; 430/30

(56) References Cited

U.S. PATENT DOCUMENTS

| | | | | |
|---|---|---|---|---|
| 5,018,008 A | * | 5/1991 | Asada | 358/518 |
| 5,208,911 A | | 5/1993 | Newman et al. | |
| 5,267,030 A | | 11/1993 | Giorgianni et al. | |
| 5,300,381 A | * | 4/1994 | Buhr et al. | 430/30 |
| 5,528,339 A | | 6/1996 | Buhr et al. | |
| 5,579,132 A | | 11/1996 | Takahashi et al. | |
| 5,582,961 A | | 12/1996 | Giorgianni et al. | |
| 5,596,428 A | * | 1/1997 | Tytgat et al. | 358/518 |
| 6,005,968 A | * | 12/1999 | Granger | 382/162 |
| 6,088,038 A | * | 7/2000 | Edge et al. | 345/600 |
| 6,396,599 B1 | * | 5/2002 | Patton et al. | 358/1.9 |
| 6,459,500 B1 | * | 10/2002 | Takaoka | 358/1.9 |
| 6,633,410 B1 | * | 10/2003 | Narushima | 358/1.9 |
| 6,643,398 B2 | * | 11/2003 | Moriwaki | 382/167 |

OTHER PUBLICATIONS

Goll et al., "Modern Exposure Determination for Customizing Photofinishing Printer Response," *Journal of Applied Photographic Engineering*, vol. 5, No. 2, 1979, pp. 99–104.

R. W. G. Hunt, "How To Make Pictures and Please People," *The Seventh Color Imaging Conference: Color Science, Systems, and Applications*, 1999, pp. 9–13.

"Measuring Colour", Second Edition, R.W.G. Hunt, Ellis Horwood Limited, 1991, Market Cross House, Cooper Street, Chichester, West Sussex, PO19 1EB, England.

"On the Preferred Reproduction of Flesh, Blue–Sky, and Green–Grass Colors", C.J. Bartleson and C.P. Bray, Research Laboratories, Eastman Kodak Company, Photographic Science and Engineering, vol. 6, No. 1, Jan.–Feb. 1962.

* cited by examiner

*Primary Examiner*—Twyler Lamb
*Assistant Examiner*—Timothy J. Stephany
(74) *Attorney, Agent, or Firm*—Thomas H. Close

(57) ABSTRACT

A method of automatically processing a digital color image, the digital color image having pixels values from which lightness, chroma, and hue values of the image can be deduced according to a predetermined transform, includes the steps of: transforming the pixel values to lightness, chroma and hue values; transforming the hue values by consistently and smoothly moving the hue values within a predetermined region of color space toward or away from hues of predetermined preferred colors; and consistently and smoothly shifting the hue values in a predetermined region of color space to avoid predetermined objectionable colors.

59 Claims, 18 Drawing Sheets

COLOR IMAGE REPRODUCTION OF SCENES WITH PREFERENTIAL COLOR MAPPING

FIELD OF THE INVENTION

This invention relates to digital image processing and in particular to automatically processing a digital image to produce a visual color reproduction of a scene. More specifically, the invention relates to a visual color reproduction of a scene having preferred color reproduction.

BACKGROUND OF THE INVENTION

Color image reproduction methods and systems known in the art capture images on image-receptive media, which can be stored in analog or digital form, and then output as a visual reproduction. For example, color images may be captured on photographic negative film and then reproduced optically on photographic paper. Images can also be captured on positive photographic media, and then viewed directly, or copied onto other transparent and reflective media. In addition, color negative films, transparency films or reflective prints can be scanned for input to digital imaging systems. Subsequently, digital color and tone manipulations can be applied to the digital picture element (pixel) values in order to produce the best possible reproduction for the intended output device and medium, and the resulting images can be viewed on monitors, printed on silver halide photographic paper or on other reflective media using inkjet, dye sublimation or electrophotographic printers. Digital images can also be encoded in a defined color space and stored on various media, e.g. Kodak Photo CD, Kodak Picture Disk or CD, at any point in this sequence for future processing. In other cases, color images can be captured by electronic devices, such as video or still CCD cameras, and viewed on monitors or printed using inkjet or dye sublimation thermal printers.

In each case previously cited, these systems are subjected to customer satisfaction criteria and may or may not embody digital tone reproduction manipulation or some form of color enhancement. The systems mentioned above are just some examples of color image reproduction systems.

It is well known in the art, that the best reproductions of original scenes do not constitute a 1:1 mapping of scene colorimetry. For example, the correct scaling of lightness and chroma values depends on the viewing conditions of the original scene and the reproduction. For the purpose of this discussion, viewing conditions are defined as the overall luminance level of the scene or reproduction, the relative brightness of the surround, the state of chromatic adaptation of the observer and the amount of stray light (flare) present. Equivalent color has been defined, as a reproduction, in which the chromaticities, relative luminances and absolute luminances are such that, when seen in the picture-viewing conditions, they have the same appearance as the original scene. This type of match is addressed by color appearance models. It has been argued that equivalent color reproduction produces high quality images.

There is another type of color reproduction that can enhance images beyond equivalent reproduction. Preferred color reproduction is defined as a reproduction in which the colors depart from equality of appearance to those of the original, either absolutely or relative to white, in order to give a more pleasing result to the viewer. Some preferred color enhancements are based on the concept of memory colors. Research has shown, that our memory of certain colors, for example skin colors, foliage and blue sky, deviates from the actual color. Memory colors often have different hues and enhanced colorfulness compared with the actual colors. There is evidence that viewers prefer reproductions that are closer to the memory color than to the actual color. Several researchers have tried to obtain optimum positions for these colors in controlled psychophysical experiments. However, the results often contradict each other, and it has been shown that color preferences may change over time as systems with larger color gamuts become available. The concept of memory colors has never been systematically incorporated into the design of color reproduction systems. While the principles of preferred color reproduction, including the importance of hue reproduction and memory colors, were recently summarized by Hunt in a general fashion (R. W. G. Hunt, "How To Make Pictures and Please People", *The Seventh Color Imaging Conference*, IS&T, Springfield, Va., 1999), it is not obvious how to make images according to these principles. Our experience has shown that it is impossible to produce images that embody all the principles of preferred color reproduction using conventional silver halide film/paper systems.

Current optical and digital photofinishing systems produce hues of reproduced colors that change as a function of lightness and chroma, thus giving the reproductions a somewhat unnatural appearance. FIG. 1 shows an example of the hue reproduction capabilities of a current consumer color negative/positive system in terms of a CIELAB a*/b* plot. For demonstration purposes the CIE 1976 a,b chroma, $C^*_{ab}$, was maintained at the original color position. The tails of the arrows denote the original color while the heads of the arrows (symbols) show the reproduced color. In this diagram, colors of constant CIE 1976 a,b hue angle, $h_{ab}$, fall along lines that emanate from the origin (a*=0, b*=0). The abscissa approximately corresponds to the green-red axis, while the ordinate represents the blue-yellow axis. Colors of constant CIE 1976 a,b chroma are represented by concentric circles around the origin. FIG. 1 shows that hues of colors of similar original hue angles may change in opposite directions. Furthermore, hue angle errors of saturated (high chroma) colors are often so large, that a reproduced color may cross a color name boundary. FIG. 1 for example suggests that saturated greens might be reproduced yellow.

One of the important criteria for viewer satisfaction in photographic reproductions is the correspondence between the color stimuli in the original scene compared to those of the reproduction. We find that viewers generally prefer to have high quality images with pleasing tone reproduction, pleasing hues, and high colorfulness while maintaining good skin tone. Technological advances have been made over the years in photographic films by improving spectral sensitivities, incorporating more chemical enhancement, in photographic papers by increasing the paper contrast, and in the whole system by co-optimizing film and paper spectral sensitivities and dyes. Some current methods for making color reproductions produce fairly bright colors and offer reasonable skin tone reproduction; however, there have been limitations on the extent to which color enhancement can be employed. Conventional silver halide photographic systems are subject to limitations imposed by optically printing one chemically developed material onto another chemically developable material. As a result, we find that they generally do not reproduce the scenes in a way that is most preferred by the viewer.

Aside from color enhancement, the quality of image reproductions is also affected by the tone scale or tone mapping employed to reproduce the density variations that make up an image. It has previously been discovered that the use of a preferential tone scale or mapping as described generally in U.S. Pat. No. 5,300,381, issued Apr. 5, 1994 to Buhr et al., entitled "Color Image Reproduction of Scenes with Preferential Tone Mapping," can be utilized to provide a reproduced image that is perceived by the viewer to be a reproduction of the original scene preferred to that previously obtainable. Buhr et al. also provided a solution to the problem of producing pleasing skin tones in combination with high color saturation, as described in U.S. Pat. No. 5,528,339, issued Jun. 18, 1996, entitled "Color Image Reproduction of Scenes with Color Enhancement and Preferential Tone Mapping."

The prior improvement in tone mapping and color enhancement has provided a degree of preferred reproduction of color images, but the use of tone mapping alone has not enabled the full extent of improvement desired by the viewer, in particular as far as hue reproduction is concerned. Recently, digital printing (e.g. the Digital Minilab Frontier 350 available from the Fuji Photofilm Company USA) and digitally-modified optical-printing (e.g. Agfa MSP DIMAX® printer available from Agfa A.G.) photofinishing systems have been introduced. These systems have introduced improvements in tone reproduction but have done little to improve color reproduction. Moreover, it has not been fully appreciated that the preferred visual reproduction does not usually correspond to the most calorimetrically accurate rendition. There is a need, therefore, for an improved image processing method that produces improved color reproduction.

SUMMARY OF THE INVENTION

The need for improved color reproduction is met according to the present invention by providing a method of automatically processing a digital color image, the digital color image having pixels values from which lightness, chroma, and hue values of the image can be deduced according to a predetermined transform, that includes the steps of: transforming the pixel values to lightness, chroma and hue values; transforming the hue values by consistently and smoothly moving the hue values within a predetermined region of color space toward or away from hues of predetermined preferred colors; and consistently and smoothly shifting the hue values in a predetermined region of color space to avoid predetermined objectionable colors.

The method of the present invention has the advantage that the reproduced images are preferred by viewers over those produced by current color reproduction systems.

DETAILED DESCRIPTION OF THE INVENTION

Figure 1:
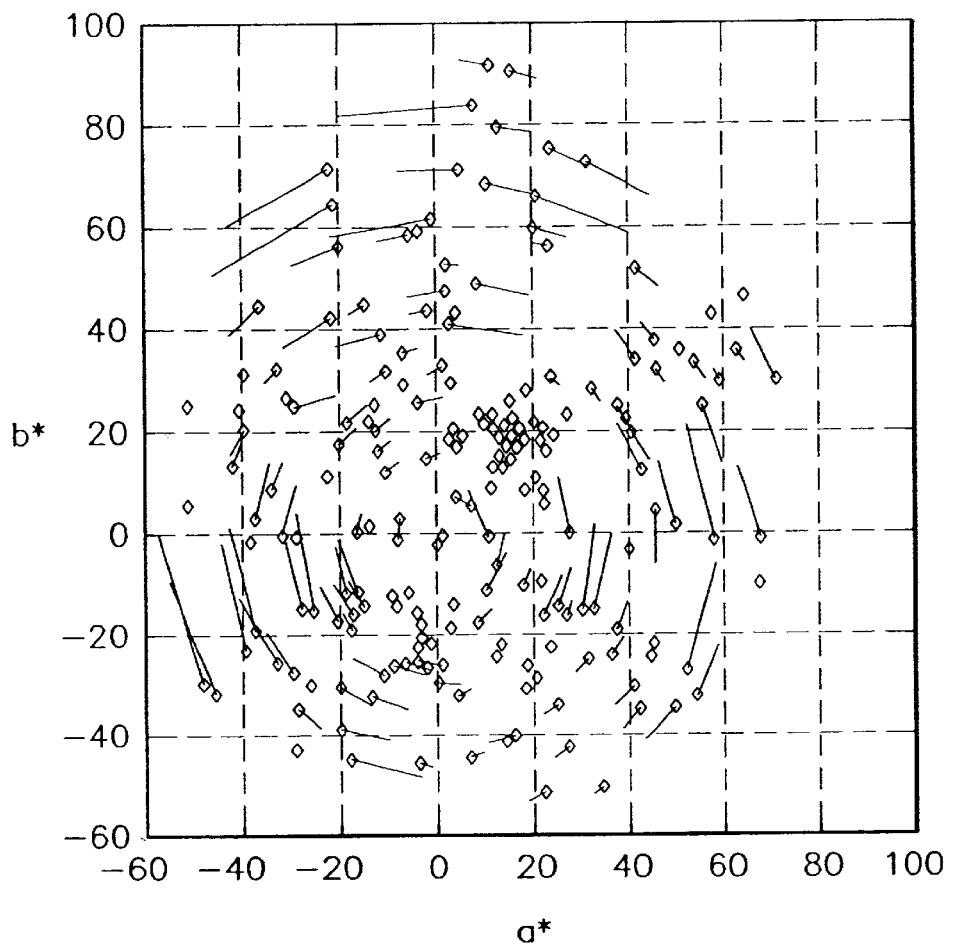
FIG. 1 is a plot showing the hue reproduction capabilities of a current consumer color negative/positive system.

The invention provides procedures for the mapping of the colors in an original scene to those in a reproduction of the scene that results in a highly preferred rendition of the scene to the viewer. The scene rendition is created via independent control of different regions of color space. The invention provides a method for producing images of higher color and tone quality than is currently achieved in optical and digital photofinishing. This quality is achieved by mapping images from different input sources (color negative films, transparencies, silver halide films specifically designed for scanning, digital cameras, etc.) into a common well-defined large color gamut calorimetric space that accurately represents scene tones and subsequently applying preferred color transformations. These transformations include preferred color hue rotations, chroma boost and tone scale operations to obtain an image that can be sent to any output device and/or medium, assuming the color-modifying properties of these devices and media are known. Compared with the previously described method of color enhancement in U.S. Pat. No. 5,528,339, additional improvements in color quality can be achieved by fine-tuning the chroma enhancement and by applying preferred color hue rotations. An even higher degree of customer satisfaction can be achieved if these preferences are customized for each customer. We have found that viewers prefer accurate rendition of hues for most colors with the exception of some colors, where a slightly different rendition from the actual hue is preferred. Moreover, small hue rotations can be employed for some colors in order to increase the robustness of the system with respect to the variability commonly encountered in photofinishing.

It has been found that reproductions that have been modified as prescribed in the invention, i.e. with hues as described in the invention and with enhancement of the color saturation while maintaining pleasing skin tones, provide images that viewers prefer. The invention describes a relationship between scene colorimetry and colorimetry of the reproduced image that produces images that viewers prefer over color reproductions that are currently available. Scene colorimetry is defined as the CIE tristimulus values, XYZ, of colored objects in a scene under a given illuminant, calculated according to the color-matching functions of the CIE 1931 Standard Colorimetric Observer. Colorimetry of the reproduced image refers to the CIE tristimulus values, XYZ, of the reproduced objects, in hardcopy or softcopy, under a given illuminant calculated according to the color-matching functions of the CIE 1931 Standard Colorimetric Observer. For the purpose of the description of this invention, the scene and reproduction illuminants are chosen as the CIE Standard Illuminant D50. The encoding of scene and reproduction colorimetry, i.e. the numerical specification of color information, is not limited to CIE XYZ values. Any reversible transformation between CIE XYZ values of real surface colors and other color encoding metrics can be used, e.g. CIELAB, CIELUV, tristimulus values of any linear combination of the color-matching functions of the CIE 1931 Standard Colorimetric Observer, nonlinear encoding metrics of tristimulus values. For the purpose of the description of the invention, scene and reproduced colorimetry will be represented in terms of CIE 1976 CIELAB values. Within the framework of this invention, this selection also defines the measurement methods of color and the signal-processing transformations that determine the meaning of encoded color values.

We have a found a method to control hues in reproduced images more tightly than in any photofinishing system currently available. Apart from designed hue shifts in certain regions of color space, which will be described below, this method also maintains hue as lightness and chroma vary, producing images with preferred quality.

An unexpected advantage is gained by producing the visual reproduction to meet both the hue and color enhancement requirements of this invention and preferred tone scale mapping and color saturation enhancements described previously. Thus using the method of the present invention, a color imaging system is able to produce images that are not only aesthetically pleasing, but also appropriately rendered productions of any image using any media or device regardless of the origin or the media selected for the reproduction of the image.

The method for contrast and saturation enhancements disclosed by Buhr, et al. in U.S. Pat. No. 5,528,339, also enables the customization of the image processing according to the present invention to cater to differences in color preferences of individual consumers. We have found that some viewers generally prefer lower contrast and/or colorfulness while others generally prefer higher settings of these parameters.

Our method of improved preferred color reproduction can be applied to any digital intermediary images, produced from film capture or by electronic capture devices (electronic still and video cameras) as long as the captured image is a sufficiently accurate recreation of the original scene. In a digital photofinishing system, the step of recreating the scene colorimetry might include suitable algorithms to correct for variations in overall exposure and color balance due to exposure control errors on the image capturing device and variations in color temperature of the taking illuminant.

Figure 2:
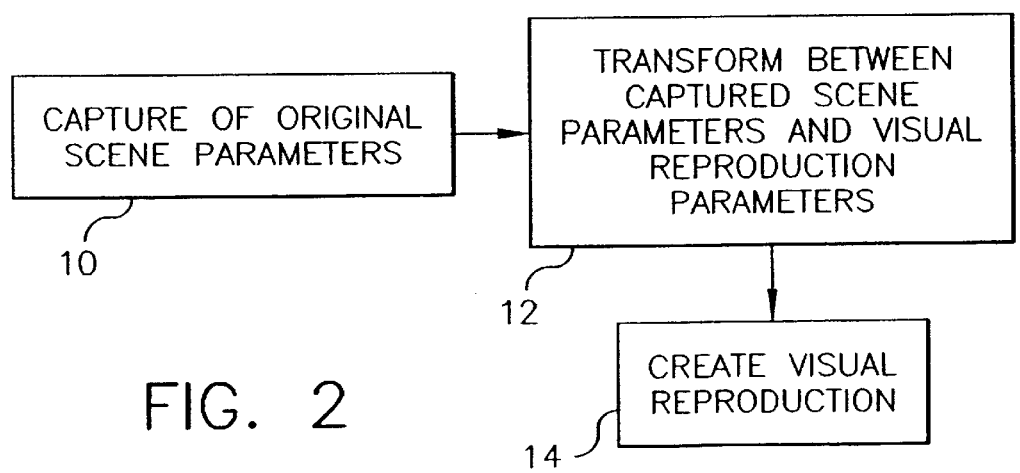
FIG. 2 is a block diagram showing a generalized digital color reproduction method useful in practicing the present invention.

Referring to FIG. 2, the overall process of digital image reproduction includes three basic steps. First, the original scene parameters are captured (10) for example, by traditional silver halide photography, or electronic photography. Next, the scene parameters are transformed (12) to visual reproduction parameters using processes such as single- and multiple-dimension look up tables and matrix transformations. Finally, a visual representation of the processed image is created (14), for example by displaying the image on a soft display such as a color monitor, or a hard copy output device such as a color printer. These steps will be described in further detail below. The present invention resides in the second step of transforming the scene parameters to visual reproduction parameters.

Referring to step 12 of FIG. 2, the color enhancements described in this invention as lightness, hue and chroma manipulations, are applied. This step can be implemented in conjunction with other digital image processing algorithms that improve the overall quality of the reproduction. The algorithms may or may not be image-specific. Examples include adjustments of the scene dynamic range to match the dynamic range of the intended output medium and/or device, digital noise reduction, sharpening algorithms and redeye removal. These algorithms can be applied in a suitable position in the overall processing sequence, i.e. before, as part of, or after the preferred color manipulations.

While the invention specifies mappings between scene and reproduced colorimetry that produce images which are preferred by the viewer, these color enhancements can be implemented as mappings between any suitable data metrics. Examples include RGB and CMY device color encodings, scene and reproduction CIELAB or CIELUV values, linear or nonlinear scene RGB color encodings. The image processing sequence can be comprised of any sequence of scalar matrices, polynomials, or one- or multi-dimensional lookup tables while taking into account the gamut of the output device in order to maintain the desired image response. These operations can also be performed by a series of concatenated ICC (International Color Consortium) profiles; see U.S. Pat. No. 5,208,911, issued May 4, 1993 to Newman et al., entitled "Method and Apparatus for Storing and Communicating a Transform Definition which Includes Sample Values Representing an Input/Output Relation of an Image Transformation."

Referring to step 14 of FIG. 2, an improved digital imaging system could readily incorporate the enhancements described above with respect to step 12; thus, images captured on negative or positive film could be shown on video monitors or printed on negative or positive photographic papers. In the more general case, the scene may be reproduced as a reflection print by any means including a print process, such as a photographic, electrophotographic, inkjet or thermal dye transfer or similar process, or as a positive transparency or as a self-illuminated image, such as in the case of a CRT image, or any other means known in the art.

In this final step of making the reproduction in form of a hardcopy or softcopy, the desired colorimetric values of the reproduction are translated to device code values. This can be accomplished by generating an ICC profile for the intended output device. If the color gamut of the output device does not match the gamut of the intended reproduction, a suitable gamut mapping algorithm can be incorporated in the sequence. Aside from standard calibration procedures, with regard to the stored images and their original capture medium, no adjustments to the devices need be required in order to make a preferred reproduction of the original image.

At any point in the processing sequence, the digitized images can also be stored for later display or reproduction, or they can be transmitted over networks. An example of printing over a network is Kodak Photonet Online service offered by the Eastman Kodak Company, Rochester, N.Y.

Figure 3:
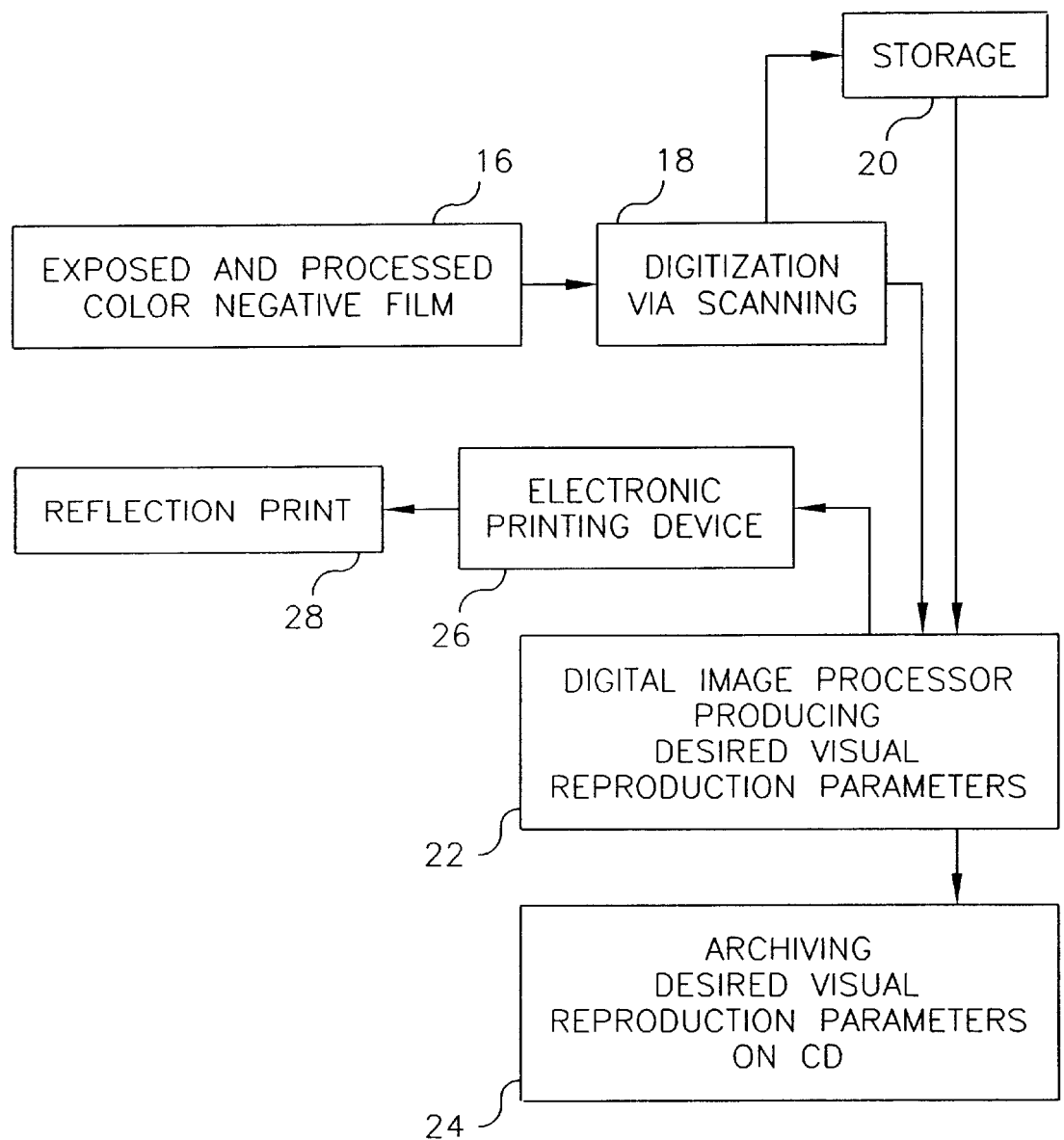
FIG. 3 is a block diagram showing a digital image processing system for processing images captured on color negative film.

FIG. 3 shows a more detailed description of a method for processing images captured on color negative film that are scanned and reproduced in a digital photofinishing system. A color film is exposed and processed (16). The images are digitized (18) by scanning. The digital images may be stored (20), or immediately processed (22) to produce the desired visual reproduction parameters. The reproduction parameters may be archived (24) for future use, or immediately displayed by printing (26) on an electronic printing device to produce a reflection print 28.

Figure 4:
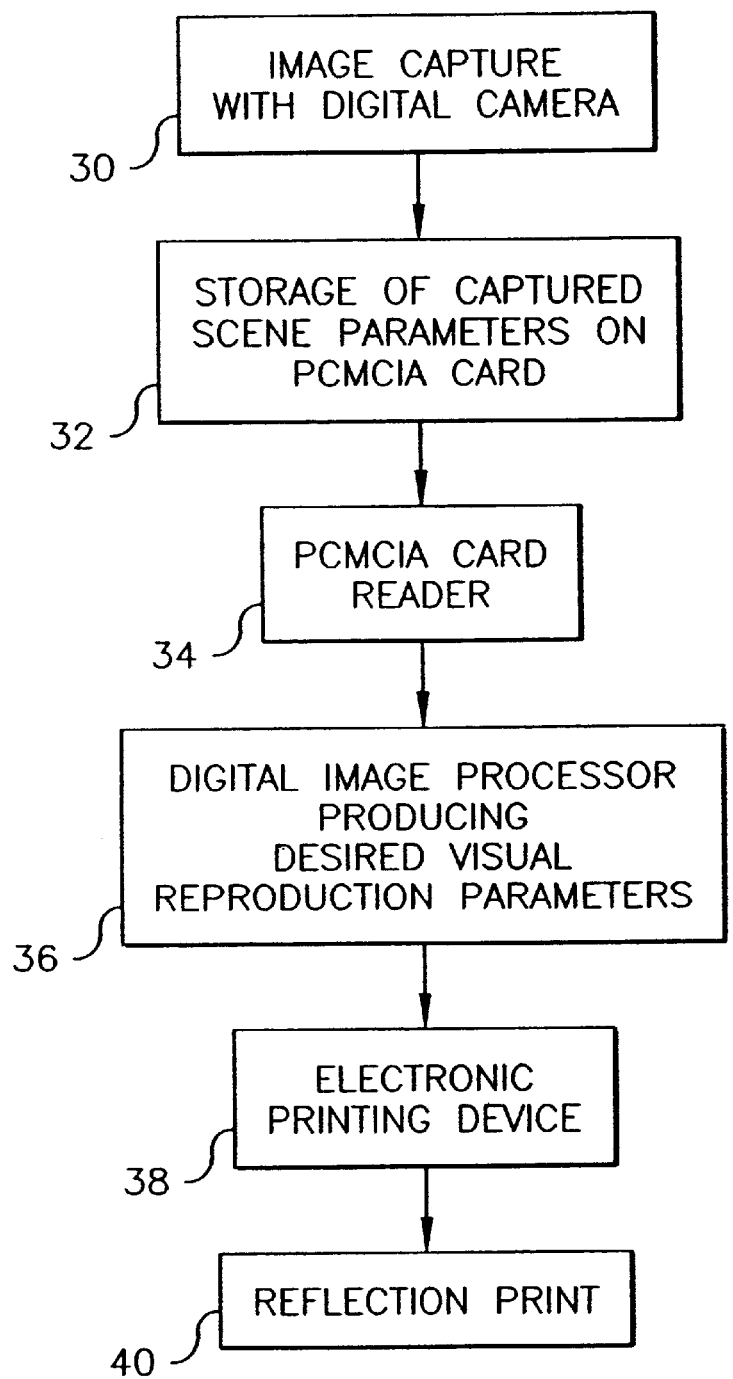
FIG. 4 is a block diagram showing a digital image processing system for processing images captured by a digital camera.

Referring to FIG. 4 an example of processing images from a digital camera reproduced in a digital photofinishing system is shown. The digital images are captured (30) and captured scene parameters are stored (32) on a storage device such as a PCMCIA card. The scene parameters are read (34) from the PCMCIA card and processed (36) to produce the desired visual reproduction parameters. The images are displayed by printing (38) on an electronic printing device to produce a reflection print 40.

The improved digital color imaging system of the present invention has the capability to produce images having preferred hues, highly saturated colors and pleasing skin tone reproduction that viewers perceive as a preferred reproduction of the original scene. The three elements of the invention, i.e. capture of the original scene parameters (10), color and tone enhancement (12) and reproduction of the resulting image (14) will now be described in detail.

FIG. 2, Step (10)—Original Scene Parameter Capture

This step is necessary within the framework of this invention in order to generate the correct aim values for the subsequent preferred color and tone manipulations. Capturing the original scene parameters can be accomplished by any light-sensitive element, or sensor, capable of sensing the color stimuli comprising a scene in a manner, which quantitatively determines their relative logarithmic luminances. The sensor is typically contained in a device or camera, which controls its exposure to light. Examples of cameras and sensors include, but are not limited to, cameras using photographic media and electronic cameras using CCD (Charge-Coupled Device), photodiode or CMOS sensors. Cameras and sensors may be of any suitable physical dimensions.

Scene capture may be accomplished using all currently available silver halide photosensitive materials that meet certain requirements for color reproduction capabilities as discussed below, as well as those that may appear in future. Examples include transparent films, semi-reflective films, and reflective papers, both positive and negative working. The film may contain non-optically sensitive materials, such as magnetic or electrical elements, as embodied by the Advanced Photographic System (APS). The film may also be designed specifically for scanning applications. The optical representations may be two-dimensional or three-dimensional and either still or moving scenes. A typical embodiment for conventional silver halide photography is the use of a 35 mm single lens reflex camera exposing color negative film, followed by Kodak Flexicolor™ C-41 chemical development to produce a representation of the original scene that varies in optical density.

In the case of capturing scene parameters on photographic materials, such as these listed above, electronic representations of the original scene parameters can be created by converting the non-electronic representations. Optical scanning is an example of the conversion operation. Scanning can be accomplished by using a microdensitometer, linear CCD array, or similar device. For example, exposed and processed color negative film can be optically read using a microdensitometer to produce a digitized image. Any optical representation can be transformed in some manner to produce an acceptable intermediate representation of the original scene parameters as long as the transformation step is conducted in a quantifiable manner. The scanning of two-dimensional and three-dimensional optical representations can be done in transmission or reflection mode with a device which scans by point, line, or area. A microdensitometer generally uses a small illuminated spot to measure with 3 colored filters the point-by-point (pixel-by-pixel) transmission of a film sample or the reflection of a paper sample. The scanning process generally follows a regular pattern to completely measure the optical representation of the scene. The electronic signal measured by the microdensitometer or CCD scanner is usually an analog signal. If desirable, the initial analog signal may be digitized as an integral operation of the scanning device, or it may be effected as a subsequent step to the scanning operation. It is most convenient to use a CCD scanner to perform the transformation from optical representation to electronic representation because scanning can be done rapidly in this case. A CCD scanner can scan a line of pixels at the same time or the entire image area with a 2-dimensional CCD sensor. A suitable embodiment for CCD scanning is the Kodak CLAS Digital Film Scanner HR200.

The scene may also be captured with an electronic camera containing one or more photosensitive elements, which may be solid state sensors, photomultiplier tubes, storage phosphors, or other materials performing the same function. Electronic cameras capture original scene parameters using a regular array of picture elements (pixels) in one or more sensors. Solid state sensors include CCDs, typically photocapacitors (full frame sensor), photodiodes (interline sensors) or CMOS sensors. Electronic cameras typically consist of a lens element and shutter which focus the scene onto the sensor and control the exposure level and duration of the sensor. The camera may capture two-dimensional or three-dimensional images in an analog or digital mode, which may be still or moving. A camera of this type will sense the color stimuli in the original scene and convert them into an appropriate form for signal storage. The signal may be stored magnetically, optically, electronically, chemically, or biologically in the camera itself or associated equipment. A suitable embodiment for electronic capture is a Kodak DCS electronic camera, which captures a scene with a solid state full frame photocapacitor CCD sensor and buffers the image in electronic RAM and stores the image on a PCM-CIA (Personal Computer Memory Card International Association) card. The image data in RAM may be transmitted and then stored on any of a variety of media, such as magnetic tape, optical disk, magnetic disk, magneto-optical disks, etc.

Storage of scene parameters may be accomplished in a variety of ways, e.g. magnetic, optical, magneto-optical, RAM, biological, solid state, or other materials, which permanently or semi-permanently record information in a retrievable manner. Examples of suitable storage media and devices include computer hard drives, floppy disks, Kodak Photo CD™, writable optical disks such as Kodak Picture CD, Kodak Picture Disk and flash EEPROM (Erasable Electrically Programmable Read-only Memory) PCMCIA cards.

Storage of scene parameters in analog or digital form requires using a storage format. This format specifies how the image is stored and it is device dependent. For example, an image may be stored in accordance with the JPEG (Joint Photographic Equipment Group) compression standard in flash EEPROM or in a PHOTO CD format in a Kodak PHOTO CD disk (optical storage), or in sRGB format (Kodak Picture CD) or in FlashPix format (Kodak DC 260 camera). This format must be known by the writing and reading operations to accurately retrieve the stored scene parameters. A suitable embodiment for digital image formatting is the optical PHOTO CD disk of Eastman Kodak Co.

In the general case, image recording media and devices and scanning devices will not directly record the scene parameters in the way human observers perceive them. However, all of these media and devices can be characterized by a spectral response function, by a function that maps scene intensity ratios to device code values and by a multi-dimensional function or matrix that characterizes the cross talk between the at least three color channels. Therefore, obtaining the original scene parameters involves applying transformations that are the inverses of these functions. The goal of this operation is to make the captured scene parameters independent of the particular input device and/or medium. The resulting pixel values represent estimates of the scene colorimetry. A preferred method of accomplishing this is described in U.S. Pat. No. 5,267,030, issued Nov. 30, 1993 to Giorgianni et al. entitled "Method and Associated Apparatus for Forming Image Data Metrics which Achieve Media Compatibility for Subsequent Imaging Application." According to Giorgianni et al., a digital image that was created by scanning a film is transformed into a device independent color and tone space by a mathematical transformation. A data set from which the mathematical transformation can be derived is produced by exposing a sample of the film with a pattern of approximately 400 test color stimuli, chosen to adequately sample and cover the useful exposure range of the film. Red, Green and Blue (R,G,B) trichromatic exposures for a reference colorimetric image-capturing device or medium are then computed for the test stimuli, using standard colorimetric computational methods. The exposed film is processed chemically and the color patches are read by a transmission scanner which produces red, green and blue image-bearing signals (R, G, B) corresponding to each color patch. A transformation is then created relating the red, green and blue image-bearing signal values (R, G, B) for the film's test colors to the known red, green and blue trichromatic exposures of the corresponding test colors. This transformation is then used to convert digital image values that was produced by scanning a film of the type that was used to generate the transform using the following procedures.

1) converting the R, G, B image-bearing signals, which correspond to the measured transmittances of the input film, to RGB densities by using appropriate 1-dimensional look-up-tables (LUTs).

2) adjusting the RGB densities of step 1 by using a 3 by 3 matrix, to correct for differences among scanners in systems where multiple input scanners are used.

3) adjusting the RGB densities of step 2 by using another matrix operation or 3-dimensional LUT, to remove the chromatic interdependence of the image-bearing signals produced by any unwanted absorptions of the imaging dyes and inter-layer chemical interactions in the input film.

4) individually transforming the RGB densities of step 3 through appropriate 1-dimensional LUTs, derived such that the neutral scale densities of the input film are transformed to the neutral scale exposures of that film.

5) further transforming the RGB exposures of step 4 by another matrix operation to arrive at the R, G, B exposures corresponding to those which a reference image-capturing device or medium would have received if it had captured the same original scene.

Test patch sets having fewer than 400 colors can be employed to enable more efficient generation of the transformation matrices and LUTs and improved use of computational resources. In some embodiments, the mathematical operations represented by sequential application of individual matrices and LUTs can be numerically concatenated to afford improved computational speed and reduced need for computational power.

Analogous procedures can be employed to generate transformation matrices and LUTs appropriate for use with the other photographic or electronic image acquisition, image capture and image digitization paths described herein.

It is well known in the art that the scene colorimetry can not be fully reconstructed by the computational methods listed above if the spectral sensitivities of the capture medium and/or device do not represent linear combinations of the CIE 1931 Standard Colorimetric Observer color-matching functions. Therefore, the color enhancements described in this invention will produce the most preferred images if the spectral sensitivities are close approximations of this requirement. An example of a suitable photographic element is described in U.S. Pat. No. 5,582,961, issued Dec. 10, 1996 to Giorgianni et al. entitled "Photographic Elements which Achieve Colorimetrically Accurate Recording."

Most currently available image recording media and devices do not meet these stringent requirements. However, capture media and devices that deviate from the desired spectral sensitivity but record key colors with sufficient colorimetric accuracy will also produce color reproductions that are preferred over current systems. Capture media and devices will be capable of producing superior color reproduction as prescribed by the present invention if the CIE 1976 color difference, $\Delta E^*_{ab}$, of the two skin tone patches of the Macbeth Color Checker chart is below 4, and the average $\Delta E^*_{ab}$ value for the colors on the Macbeth Color Checker does not exceed 4, with maximum values below 12. Recording media and devices that fulfill these criteria are currently available. Embodiments are Kodak Generation 6 Gold films, Kodak Advantix films, Kodak Royal Gold films, Kodak digital cameras, FUJI Reala film.

The color accuracy of the capture medium or device can be assessed according to the following procedure.
1. The spectral reflectances, R, of all patches the Macbeth Color Checker are measured using a spectrophotometer or telespectroradiometer.
2. The spectral sensitivities, SS, of the capture medium or device are measured and computed using techniques known to those skilled in the art.
3. The normalized exposures, $E_n$, of the capture medium or device are computed according to the equation $$E_n = \frac{\int_{350}^{780} R(\lambda)I(\lambda)SS(\lambda)d\lambda}{\int_{350}^{780} I(\lambda)SS(\lambda)d\lambda},$$

where I is the spectral intensity distribution of the illuminant and $\lambda$ is the wavelength in nanometers.
4. CIE XYZ values, for each color patch for a given illuminant, are computed.
5. A matrix, M, is computed that predicts the XYZ values in paragraph 4 so that the error is minimized $$\begin{bmatrix} X \\ Y \\ Z \end{bmatrix} = M \begin{bmatrix} E_{n,R} \\ E_{n,G} \\ E_{n,B} \end{bmatrix}$$

where the subscripts R, G, B denote the normalized exposures of the red, green and blue sensitive layers.

Figure 5:
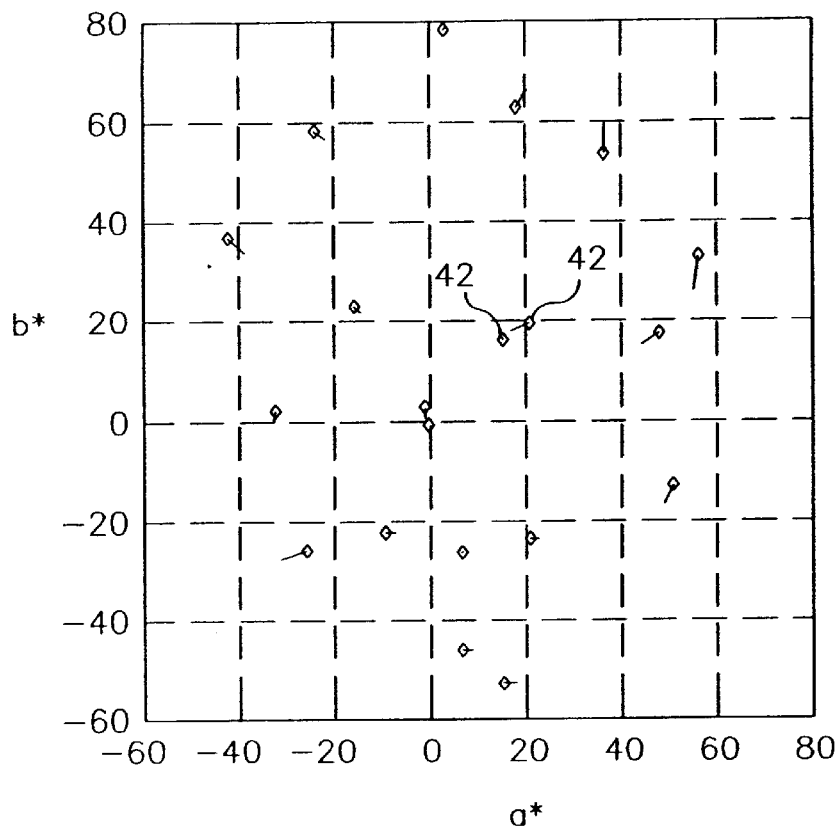
FIG. 5 is a plot showing the color capture accuracy of a consumer color negative film.

FIG. 5 shows the color accuracy of a consumer color negative film, which was assessed by the procedure described above. The tails of the arrows indicate the original color and the heads of the arrows show the captured color. This film meets the requirements for color accuracy listed above with a maximum $\Delta E^*_{ab}$ of 3.9 for the two skin tone patches 42, an average $\Delta E^*_{ab}$ of 2.6 with a maximum value of 8. It will be noted that if the procedure described above were performed perfectly, these variations would still exist in the digital representation of the scene parameters due to the nature of the spectral sensitivities of the particular film.

The particular combination of one-dimensional and multidimensional LUTs, matrices, polynomials and scalars that accomplish the transformation of the captured scene parameters to produce a digital estimate of the scene colorimetry, depend on the particular kind of illumination (spectral distribution of the illuminant and exposure of the light-sensitive element) in combination with the image capture device and medium, and in some cases the scanner, that was used to produce them. While scanner variability can be minimized by standard calibration procedures, the illuminant and the luminance levels are generally not known in photography. Additional variability is introduced by chemically processing the film. Therefore, additional analog or digital processing has to be applied in order to obtain the correct color balance and overall lightness for each image. The algorithms are commonly known as "white-balance," "color-constancy" or "scene-balance" algorithms. These algorithms can work on a single image, several images, or an entire set of images. An example of a suitable scene balance algorithm is described by. E.Goll et al., "Modem Exposure Determination for Customizing Photofinishing Printer Response", *Journal of Applied Photographic Engineering*, 2, 93 (1979). Further improvements in scene-balance algorithms might include mixed illuminant detection and subject detection.

Information accompanying the captured original scene parameters that describes the camera parameters responsible for capturing the scene can provide useful input for the signal processing algorithms. Useful information includes any single or any combination of scene illumination type, flash parameters such as flash output and/or whether the flash was directed at the subject or bounced onto the subject and/or whether the sufficient flash power was available to properly illuminate the subject, camera lens f-stop, camera exposure time, scene orientation. Additional information on the film can help to characterize the variability of the chemical process that was used to develop the film. For example, at least one or more gray reference patches with known exposure could have been exposed on the film during manufacturing.

Instead of direct capture of the original scene parameters, it is also possible to access a representation of the original scene parameters, captured and stored at some prior time. These representations may be two-dimensional or three-dimensional and may be of still or moving scenes. The only requirement for this means of generating a preferred viewed reproduction of the original scene is that the relationship between the original scene parameters and those in the accessed original scene representation be known or that it be possible to make an accurate assumption about this relationship. The accessed scene representation was at some point captured using the methods described above for direct original scene parameter capture.

FIG. 2, Step (12)—Effecting Desired Transformation Between Original Scene Parameters and the Visual Reproduction Parameters Digital image processing is a key step in the transformation from the original scene parameters to the preferred visual reproduction parameters. This invention encompasses the signal processing that is necessary to achieve preferred color and tone reproduction. CIELAB coordinates for CIE Standard Illuminant D50 illuminant will be used to illustrate the principles of this invention. This illuminant is assumed as the observer's adaptive white during capture and viewing. Furthermore, the illustrated examples assume that the scene was captured at an average luminance level>1600 cd/m$^2$, and the reproduction is viewed at luminance levels between 60 and 160 cd/m$^2$ in an average surround with known viewing flare. These are typical conditions for outdoor and flash photography and the resulting reflection prints. However, the invention is not limited to these capture and viewing conditions as it applies to any color reproduction system. Furthermore, the color transformations can be affected between any two color spaces with at least three color channels, although approximately perceptually uniform color spaces are more suitable for designing and implementing the transformations. What is covered in the invention is the relationship between the calorimetric properties of the original scene and the viewed reproduction.

Conceptually, preferred color manipulations can be divided into hue, chroma and tone scale operations. In a practical digital system these manipulations could be implemented as any sequence of n-dimensional lookup tables (n-integer>0), matrices, polynomials, shifts and scale factors. These manipulations can be implemented in software or hardware (electronic circuits).

Hue Manipulations

The prerequisite for all hue manipulations is sufficient knowledge of the hues the observer sees in the original scene. As explained in the section dedicated to the capture of the original scene parameters, the spectral sensitivities of most capture media and devices will only produce an estimate of the original scene colors. Colorimetric accuracy requirements for this estimate were given. The requirements are met by a variety of image recording media currently available. Some of these media and devices, sometimes in connection with subsequent digitization and image processing, have been described as having accurate color reproduction (see for example U.S. Pat. No. 5,579,132, issued Nov. 26, 1996 to Takahashi et al., entitled "Image Processing System and Method for Faithfully Reproducing Colors of Object from Negative Film." However, obtaining a pleasing reproduction from these media involves a tone scaling operation that is applied to at least three color channels. In optical printing, for example, color negative films are printed onto reflective paper with at least three color sensitive layers. As discussed above, this kind of tone scaling will introduce hue shifts so that the color reproduction can not be completely accurate. In addition, none of the current color reproduction systems incorporate the findings about memory colors in a systematic fashion or use small hue shifts of some colors in order to compensate for undesired hue shifts caused by the variability of the system (processing variability in films, color balance errors, etc.). This invention addresses these problems.

Figure 6:
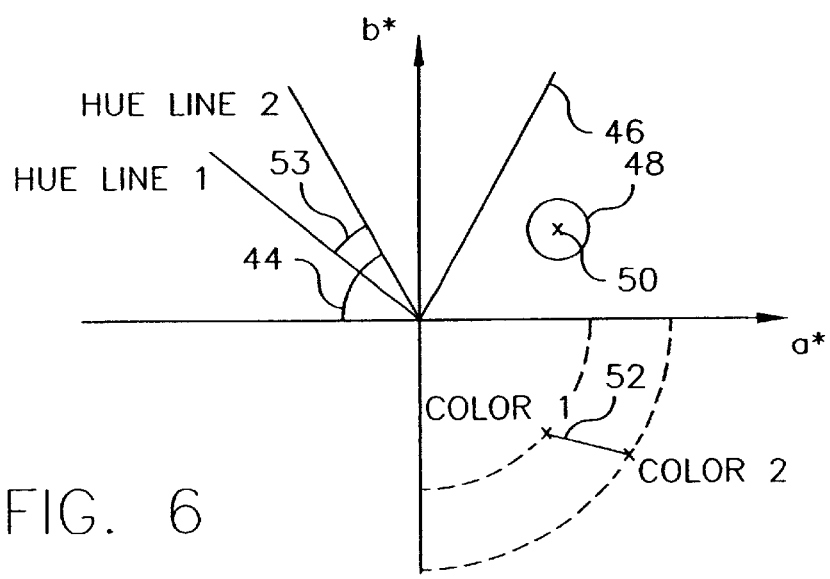
FIG. 6 is a diagram useful for explaining definitions relating to hue and chroma manipulations.

Some definitions are needed in order to explain the hue manipulations that are part of this invention. Referring to FIG. 6, hue and hue angle 44 denote the CIE 1976 a,b hue angle, $h_{ab}$ of a scene color, expressed as a digital estimate of this color. A hue line 46 comprises all colors of a given hue angle. Color on the abscissa with positive a* values correspond to a hue angle, $h_{ab}$, of zero. A region 48 of color space is defined by a centroid color 50, given in CIELAB coordinates, and all colors that fall within a certain CIELAB color difference, $\Delta E^*_{ab}$, from the centroid, in FIG. 6 shown as a projection on the CIELAB a*/b* plane. This distance can be specified as $\Delta E^*_{ab}$ itself, as a lightness (L*) difference, as an a*/b* difference, as a chroma ($C^*_{ab}$) difference, 52, and as a range 53 of hue angles ($h_{ab}$).

Figure 7:
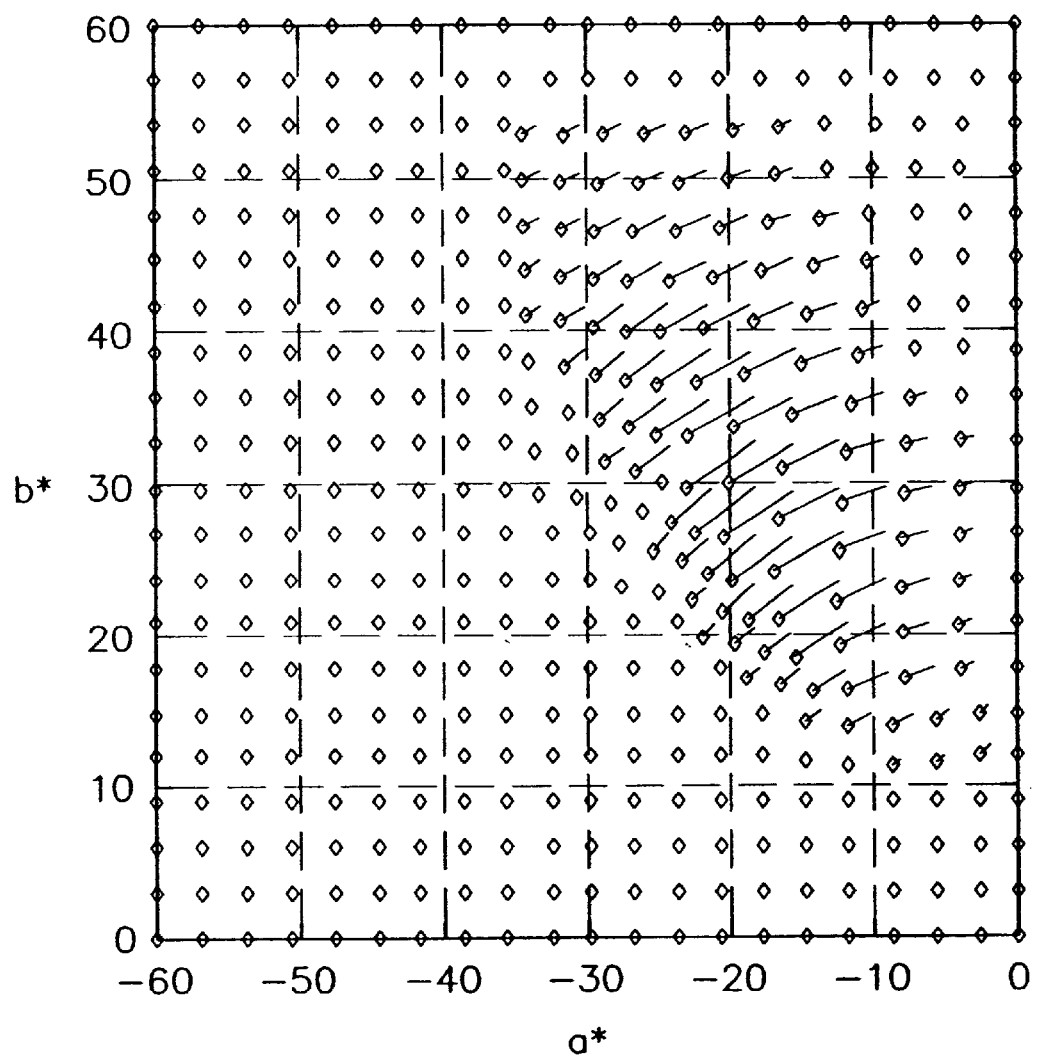
FIG. 7 is a plot illustrating the operation of consistently and smoothly shifting color within a region of color space.
Figure 8:
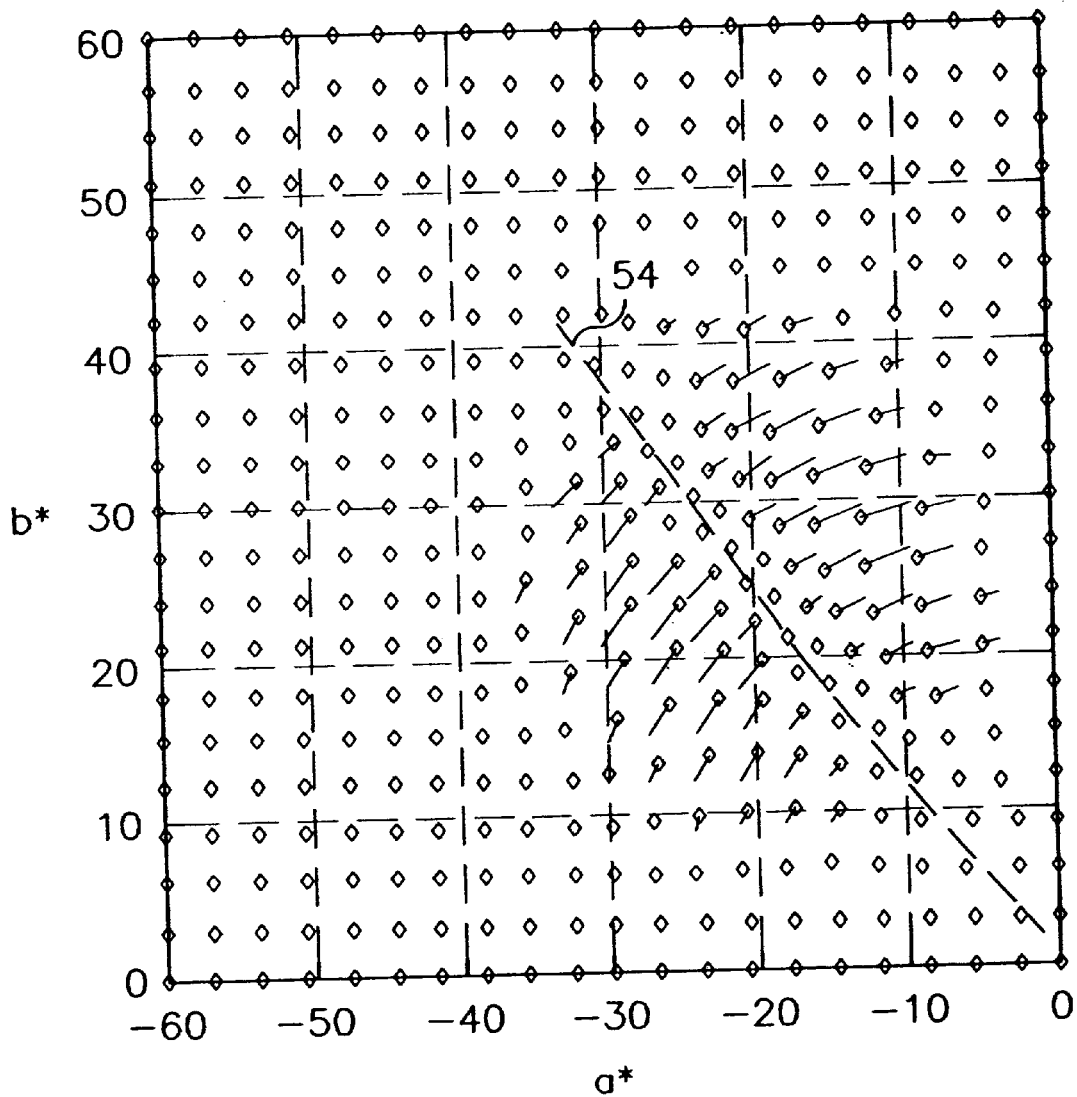
FIG. 8 is a plot illustrating the operation of consistently and smoothly moving colors toward a hue line.

The method of the present invention includes local hue manipulations. These manipulations can take the form of consistently and smoothly shifting colors within a region of color space (as shown in FIG. 7) and consistently and smoothly moving colors towards a hue line 54 (as shown in FIG. 8). Moving colors within a region of color space towards a hue line means that the hue angle of all specified colors below this hue line is increased while the hue angle of the specified colors above the hue line decreases. Shifting hues of colors within a region of color space means that the hue angle of all selected colors is either increased or decreased. Consistently shifting and moving colors means that more than 80% of the colors within the specified region of color space show the expected behavior. Smoothly shifting or moving colors in a region of color space means that the hue angle shift that colors experience as a function of hue angle is a continuous function with CIE 1976 a,b hue angle shifts below 0.5 at the outer boundary of the region. Hue angle shifts may vary as a function of lightness and chroma of the color. These smooth and consistent moves and shifts can be implemented by defining a continuous functional form between input color and a desired output hue and implementing the functional form in a LUT of any desired dimension. Alternatively, the functional formn may be directly calculated and implemented in a digital computer.

We find that reproductions that are preferred by the viewer over those from currently available color reproduction systems if the hue values in pre-selected regions of color space are transformed by consistently and smoothly moving hue values within a predetermined region of color space toward or away from hues of predetermined preferred colors, and/or consistently and smoothly shifting a predetermined region of color space to avoid predetermined objectionable colors. The reproductions will be preferred if at least one of the following regions of color space are selected and modified in terms of hue:

1. Shifting colors within a region of color space including the foliage patch of the Macbeth Color Checker consistently and smoothly towards higher hue angles, limited to a maximum hue angle rotation of 15 degrees, whereby, expressed in terms of CIELAB for CIE Standard Illuminant D50, the region is bounded by hue lines of 10–40 degrees below and above the CIE 1976 a,b hue angle of the foliage patch and includes colors that differ by at least 10 CIE 1976 a,b chroma and lightness units from the foliage patch.
2. Moving colors within the region given in step 1) above consistently and smoothly towards a hue center between CIE 1976 a,b hue angles of 115 and 135 degrees.
3. Shifting colors within a region of color space including the blue sky patch of the Macbeth Color Checker consistently and smoothly towards higher hue angles, limited to a maximum hue angle rotation of 15 degrees, whereby, expressed in terms of CIELAB for CIE Standard Illuminant D50, the region is bounded by hue lines of 10–40 degrees below and above the CIE 1976 a,b hue angle of the blue sky patch and includes colors that differ by at least 10 CIE 1976 a,b chroma and lightness units from the blue sky patch.
4. Moving colors within the region given in step 3 above consistently and smoothly towards a hue center between CIE 1976 a,b hue angles of 250 and 267 degrees.
5. Shifting colors within a region of color space including the yellow patch of the Macbeth Color Checker consistently and smoothly towards lower hue angles, limited to a maximum hue angle rotation of 10 degrees, whereby, expressed in terms of CIELAB for CIE Standard Illuminant D50, the region is bounded by hue lines of 10–20 degrees below and above the CIE 1976 a,b hue angle of the yellow patch and includes colors that differ by at least 10 CIE 1976 a,b chroma and lightness units from the yellow patch.
6. Moving colors within a region of color space including the two skin tone patches of the Macbeth Color Checker consistently and smoothly towards a hue angle between 40 and 50 degrees, whereby, expressed in terms of CIELAB for CIE Standard Illuminant D50, the region is bounded by hue lines of 10–30 degrees below and above the CIE 1976 a,b hue angles of the two skin tone patches and includes colors that differ by 10–30 CIE 1976 a,b chroma units and at least 10 lightness units from the two skin tone patches.
7. Any local hue manipulations where hues are consistently and smoothly moved towards a hue line or a whole section of color space is consistently and smoothly shifted in one direction, whereby, expressed in terms of CIELAB for CIE Standard Illuminant D50, the region affected covers a CIE 1976 a,b hue angle range of 10–60 degrees and includes colors that differ by at least 15 CIE 1976 a,b chroma and lightness values.

In addition the following two requirements have to be met:

8. The image is captured on an image capture medium and/or device capable of capturing the scene parameters such that the CIE 1976 color differences, $\Delta E^*_{ab}$, between the original scene color and the digital representation of the scene color is on average below 5 with a maximum of 12 for the colors on the Macbeth Color Checker, and a maximum of 5 for the two skin tone patches.

9. Application of chroma scaling and lightness transformation steps that maintain the hues resulting from the hue transforming step.

These specifications show, how the regions of color space to be modified in terms of hue can be selected and how the preferred reproduced hue values can be specified.

For the purpose of this invention the reproduction can be produced as a multi-step process, where the scene hue or the viewed hue of the reproduction is recreated before the manipulations prescribed in the invention are applied, or as a single step process, where a suitable color target with known spectral properties is captured and the spectral properties of the reproduction are analyzed, so that some mathematical transform that maps the scene hues to the preferred viewed hues of the reproduction can be constructed.

Figure 9:
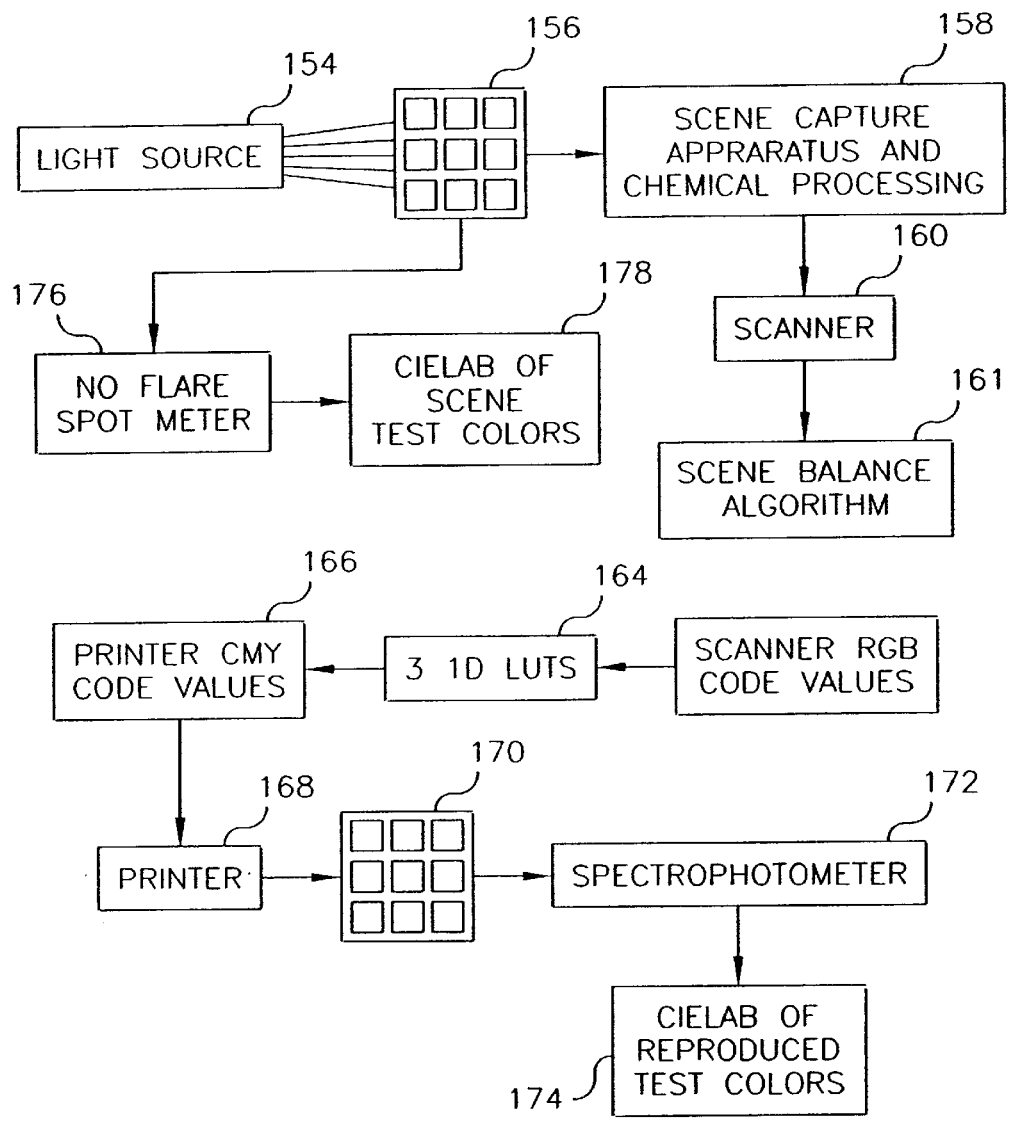
FIG. 9 is a block diagram describing the characterization of a color reproduction system.
Figure 10:
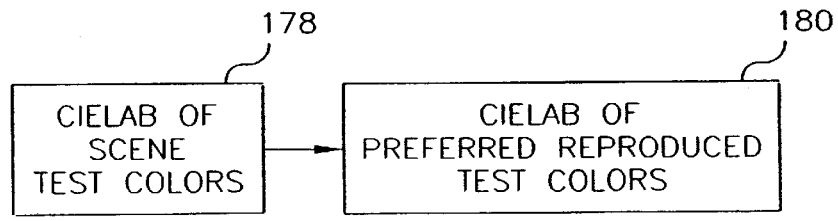
FIG. 10 is a block diagram illustrating the definition of preferred reproduced test colors.
Figure 11:
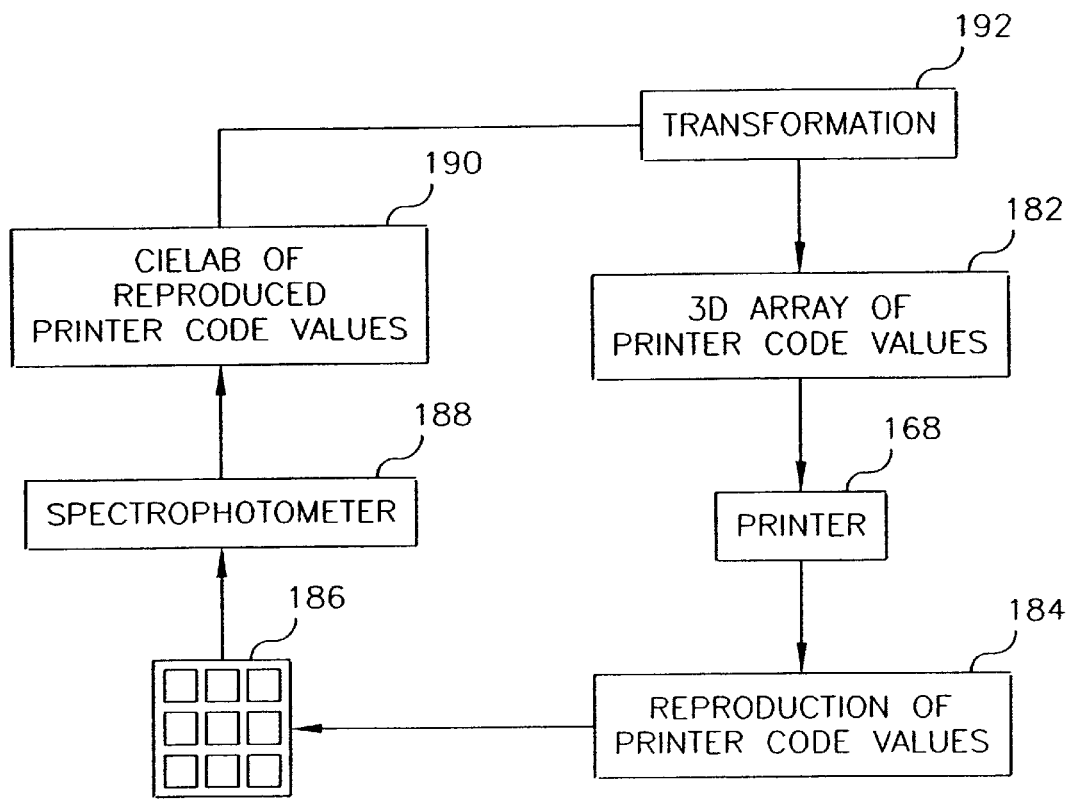
FIG. 11 is a block diagram illustrating the characterization of a printer.
Figure 12:
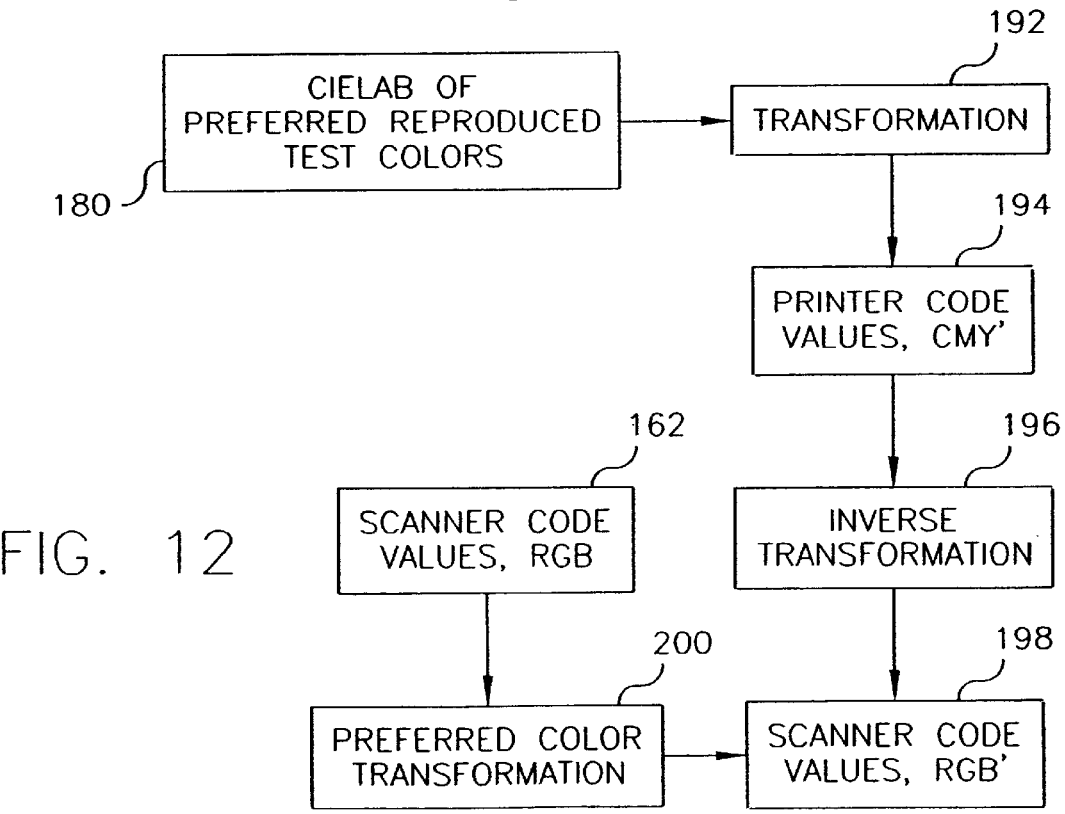
FIG. 12 is a block diagram illustrating the construction of a transformation of scanner code values so that preferred colors are reproduced.

The hue manipulations described above can be implemented at various points of the image processing sequence as transformation between any suitable data encoding metrics. The examples below show how hue information can be deduced at various steps of the processing sequence. Examples include, but are not limited to the following:

1. FIG. 9 illustrates how lightness, hue and chroma information can be deduced without the additional step of transforming captured digital representation of scene colors into a true scene color representation as described in step 10 in FIG. 2. A color negative photographic film can be scanned on a trichromatic scanner 160 whose spectral responsivities match those of a particular optical photographic printer and photographic output medium. A scene balance algorithm 161 can be applied to the scanned images followed by applying one-dimensional look-up tables 164 to each of the three color channels. The resulting pixel values 166 can be sent to a calibrated digital printer 168 to produce a print 170 in order to emulate the results of optical printing. As discussed before, without any additional manipulations, the reproduced images are less preferred by the viewers than those created as prescribed in the invention. However, a suitable test target 156 can be captured, processed and reproduced 158 as described above. CIE colorimetry, referring to CIE Standard Illuminant D50, of the target and the reproduction can be obtained, and CIE 1976 lightness and a/b chroma and hue angle of the illuminated target 178 and the reproduction 174 can be calculated according to standard procedures. A low flare telespectroradiometer 176 can be used to measure the target spectra including the illuminant 154, and a spectrophotometer 172 can be employed to measure the spectra of the reproduced target. Referring to FIG. 10, this data is compared with the preferred CIELAB values of the reproduction 180, in particular hue, which can be calculated according to the procedures outlined in cases 1–7 and 9 above. Referring to FIG. 11, as a next step, a printer characterization is required, i.e. an array of suitably chosen printer code values 182 is printed 184 to make a reproduction 186, and the CIELAB values of the reproduction 190 are measured using a spectrophotometer 188. A transformation 192 can be constructed to map the CIELAB values of the reproduction to printer code values. Referring to FIG. 12, this transformation can be used to convert the preferred CIELAB values of the reproduced test colors 180 to printer code values 194. If the inverse 196 of transformation performed by the one dimensional look up table 164 is used the scanner code values 198 corresponding to the printer code values 194 can be calculated. From the data sets 162 and 198, a transformation 200 can be constructed that alters the scanned pixel values such, that the hues are reproduced as prescribed in cases 1–7 and 9 listed above. In the image processing sequence, this transformation 200 is applied just before the transformation represented by LUT 164.

2. Scene colors can be estimated as described in step 10, FIG. 2, and encoded in any suitable data metric that represents a 1:1 mapping of CIE colorimetry, e.g. CIE XYZ, CIELAB, CIELUV, any RGB space whose primaries are linear combinations of the color matching functions, CIECAM97s and others. Suitable regions of color space for hue manipulations are selected and the preferred hues are specified according to the rules listed in cases 1–7 and 9 above. The hue transformation can be constructed between any of the color spaces listed above to modify the scene colors according to the specifications and applied to the digital image.

3. The image, scanned as detailed in example 1, or the digital estimates of the scene colors, as described in example 2, can be rendered for a particular output medium and the intended viewing conditions using any suitable nonlinear transformation. In the simplest case three one-dimensional look-up tables can be applied to the three color channels. If the relation between the pixel values of the rendered image and the CIE colorimetry of the output image is known, for example from reproducing and measuring a suitable test target, or from the color encoding specification of the resulting digital image, a transform can be constructed that alters the rendered image pixel values according to the specifications for the preferred reproduced hues. Referring to FIG. 9, this transformation is now constructed between pixel values 166 and printer code values 194. This transform is applied to the digital image.

Similar methods can be used to alter chroma and lightness according to the specifications given in this invention.

Figure 13:
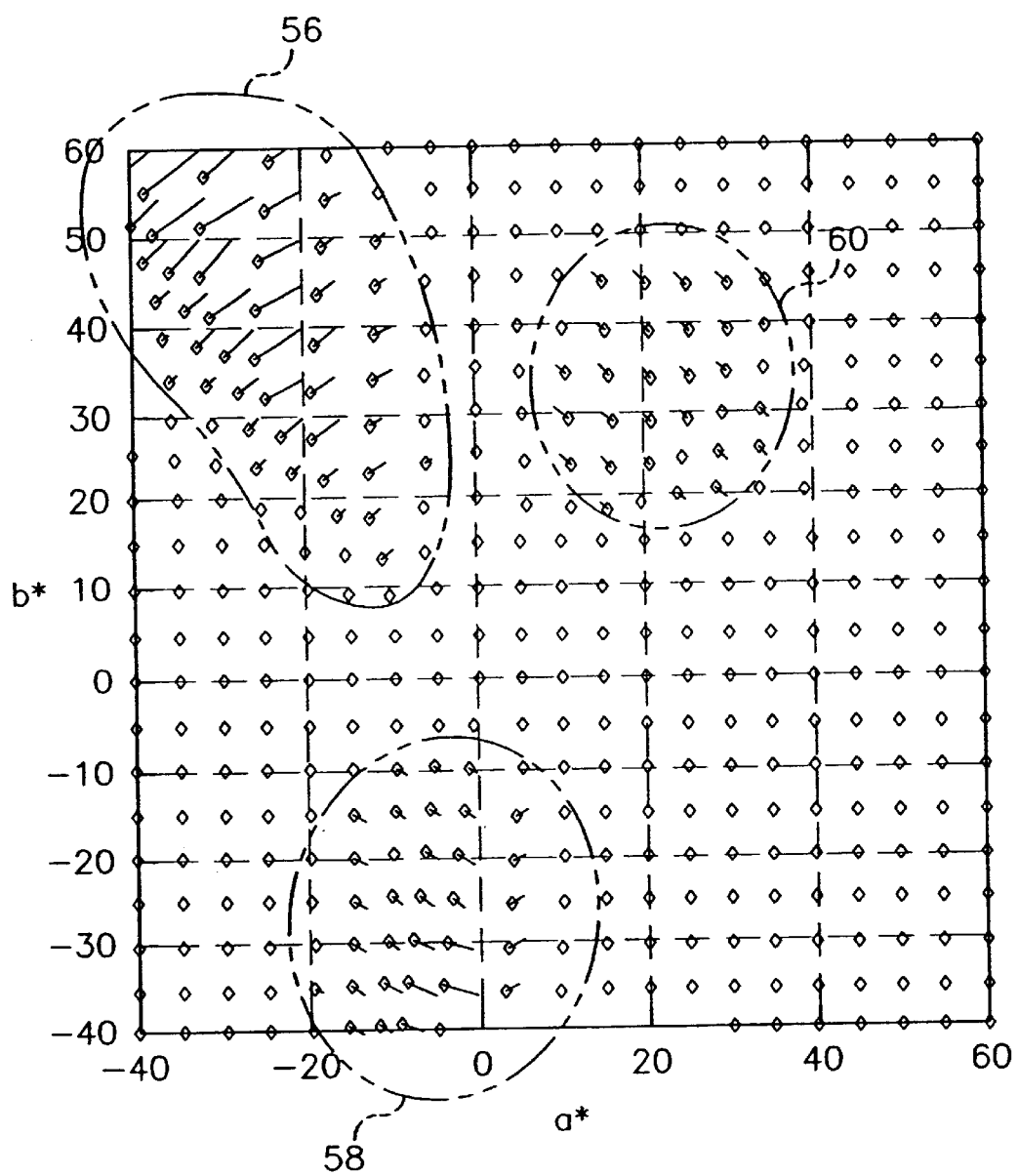
FIG. 13 is a plot showing desired hue shifts for a regular grid of CIELAB $a^*/b^*$ values in a system without processing variability.
Figure 14:
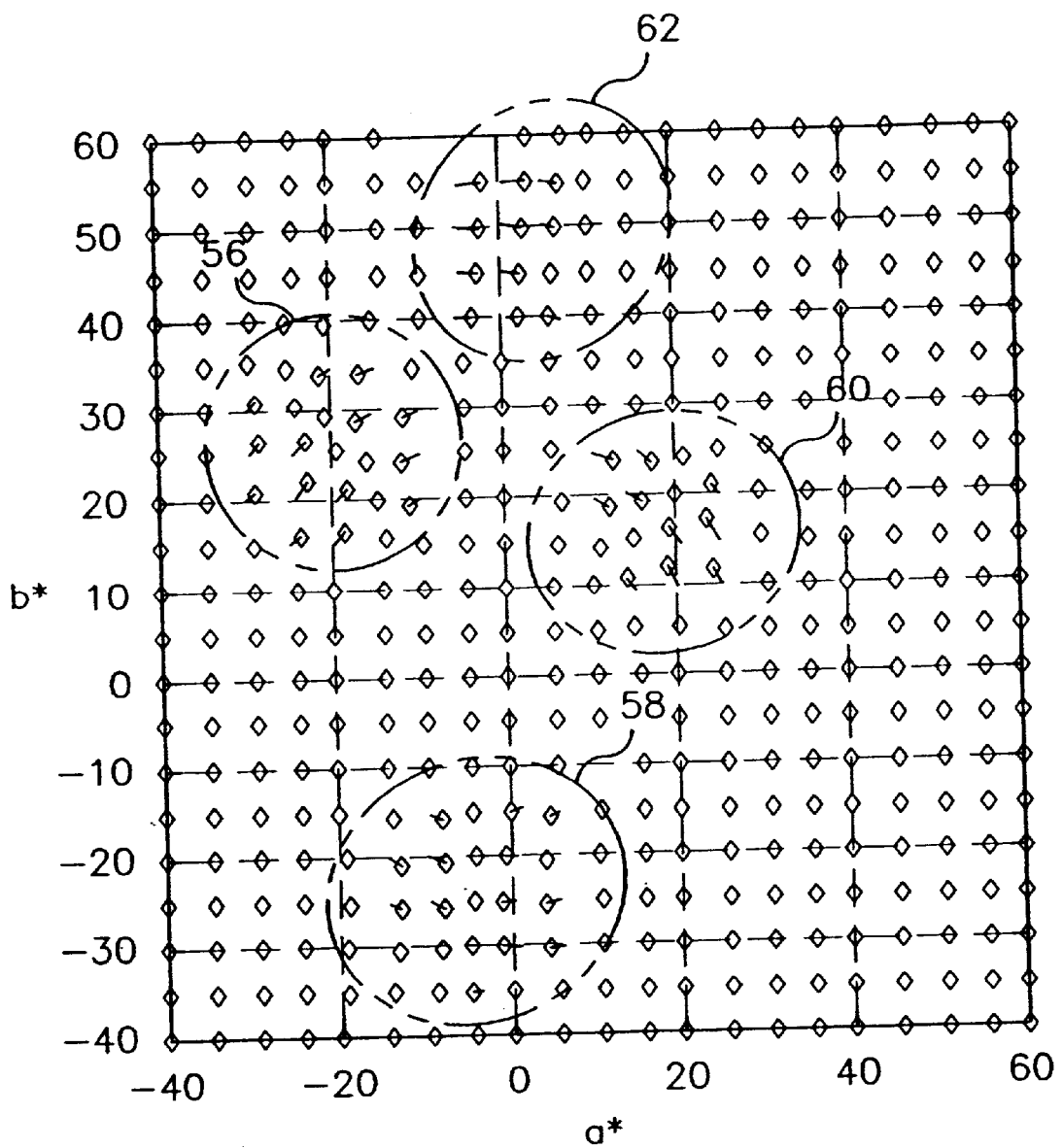
FIG. 14 is a plot showing desired hue shifts for a regular grid of CIELAB $a^*/b^*$ values in a system having processing variability.

FIGS. 13 and 14 illustrate the desired hue shifts for a regular grid of CIELAB a*, b* values calculated for CIE Standard Illuminant D50. FIG. 13 shows an example for the preferred hue reproduction in a system without processing variability. In this case the foliage 56 and blue sky 58 sectors of color space have been rotated, and skin tones 60 have been drawn towards the CIE 1976 a,b 45 degree hue line. FIG. 14 shows how the hue reproduction could be modified for a system including variability, so that the optimum system color reproduction is obtained including all the sources of processing variability. In this case, the memory colors skin 60, sky 58 and foliage 56 are consistently and smoothly moved towards a hue line, while yellow hues 62 are shifted towards orange.

Both types of hue manipulations can be implemented in practical systems. In order to avoid image processing artifacts, smooth transitions between the manipulated regions of color space and the surrounding colors must be achieved.

The present invention yields the most preferred results if the system variability is reduced compared with current systems based on a two stage chemical film/paper process. Processing variability can be reduced, for example by providing a magnetic layer or other additional information recording on film to record additional scene capture information, e.g. average luminance level, information about flash usage, color temperature or even geographical information. Electronic cameras can also record this type of information on any suitable memory card. Additionally, patches of a known exposure can be pre-exposed on the film and analyzed after the film is developed to determined the response of the film. This information can also be used in advanced scene balance algorithms.

Chroma Enhancements

Images are most preferred by viewers if neutral colors in the scene are reproduced as visually neutral colors and the images are colorful with a natural reproduction of skin tones. Their most natural reproductions are obtained if the colorfulness of objects in the image changes in proportion to their colorfulness in the scene. This behavior reflects the changes that occur when illumination levels change on the surface of an object (transition from highlights to shadows).

The requirement of a proportional relationship of the colorfulness of objects in the scene and the image is best expressed by the ratio of CIE 1976 a,b chroma values of the reproduction relative to the scene. This ratio will be called chroma ratio and alternatively is referred to as scaling chroma values.

In U.S. Pat. No. 5,528,339, Buhr et al. pointed out that constant chroma ratios throughout color space (apart from gamut limitations of the output medium and/or device) may not always produce the most preferred images. Viewers prefer the high colorfulness that is produced by some current silver halide color reproduction systems. However, due to the limitations of optically printing one chemically processed material onto another chemically processable material, high colorfulness is achieved at the expense of unnatural skin tone reproduction. Buhr et al. also established that the most preferred reproductions can be obtained by applying different chroma scaling in the skin tone region and in the remaining regions of color space and they quantified suitable boundaries for these factors. This approach will produce reproductions that are even more preferred by viewers if it is combined with the hue manipulations described in the previous section.

The range of preferred chroma ratios for skin tones and other colors acknowledges that colorfulness is subject to individual preferences and that the preferred settings also depend on the discrepancy between scene and image viewing conditions. For example, the preferred average ratio between reproduced chromas and scene chromas would differ, if the same scene was captured on color negative film for reflection print viewing or viewing on a monitor in an average surround, or if it was captured or reproduced on slide film for viewing in a darkened room. Therefore the properties of chroma ratios that produce a reproduction, that is preferred by the viewers, will be formulated in a more general way for the purpose of this invention. We found that preferred reproductions are obtained by:

1. Scaling the chroma values of the digital representation of the scene such that the CIE 1976 a,b chroma ratios of the reproduced image and the original scene for the two skin tones patches of the Macbeth Color Checker is less than or equal to that for the foliage and sky patches.
2. Selecting the scaling factor for the chroma of the patches of the Macbeth Color Checker excluding the neutral, skin, sky and foliage patches, such that the ratio of the CIE 1976 a,b chroma of the reproduced patch and the original of at least one of these patches is at least as high as the higher of the chroma ratios of the foliage and sky patches, and that the chroma ratio of at least two of these patches is at least as high as the maximum of the chroma ratios of the two skin tone patches.
3. Keeping the standard deviation of the CIE 1976 a,b chroma ratios of the reproduction and original of all color patches of the Macbeth Color Checker patches below 0.4, excluding the neutral patches.
4. Performing chroma scaling such that the reproduced chroma varies smoothly in the sense of being a continuous function of CIE 1976 lightness, chroma and hue angle.

Figure 15:
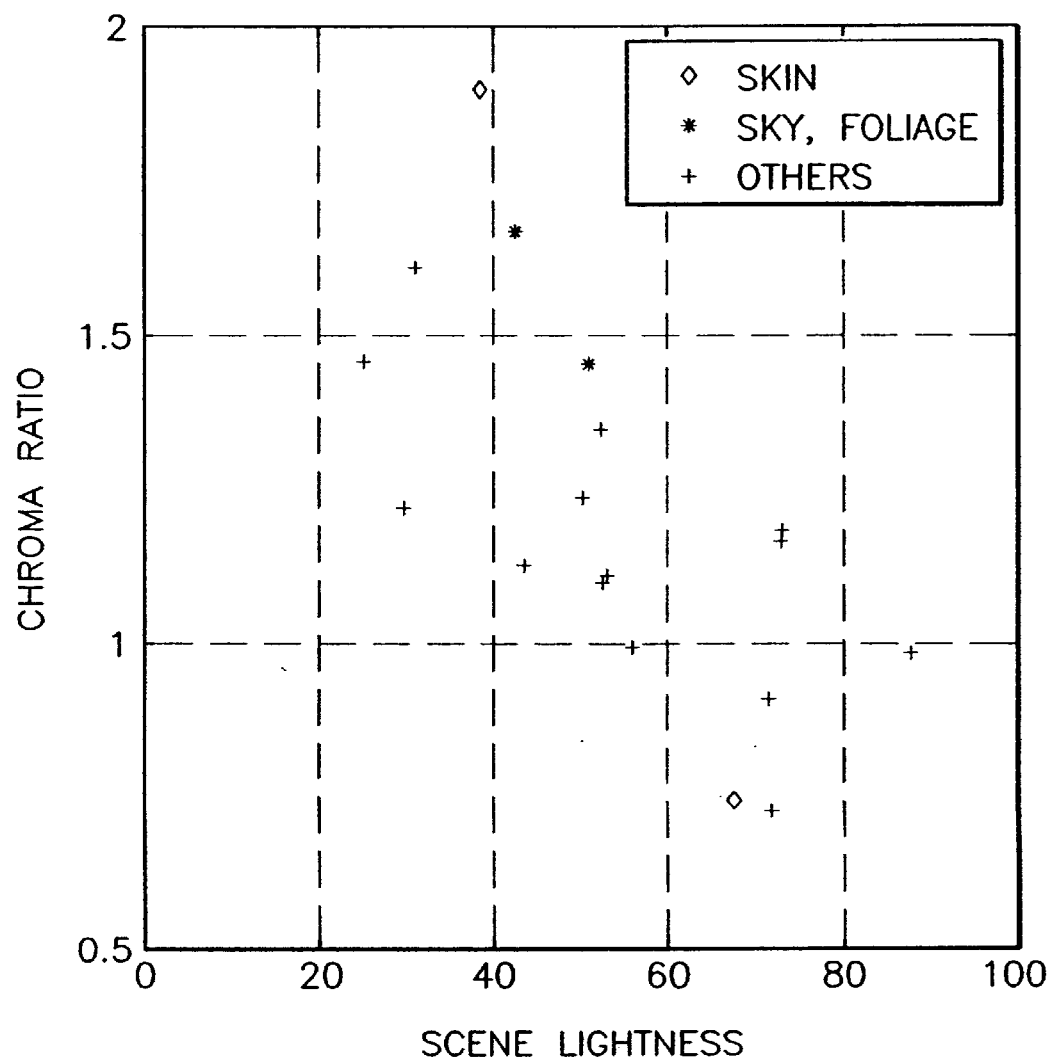
FIG. 15 is a plot showing the CIELAB chroma ratio of reproduced colors relative to the scene colors of a Macbeth Color Checker for a system that does not follow preferred rules of chroma manipulation.
Figure 16:
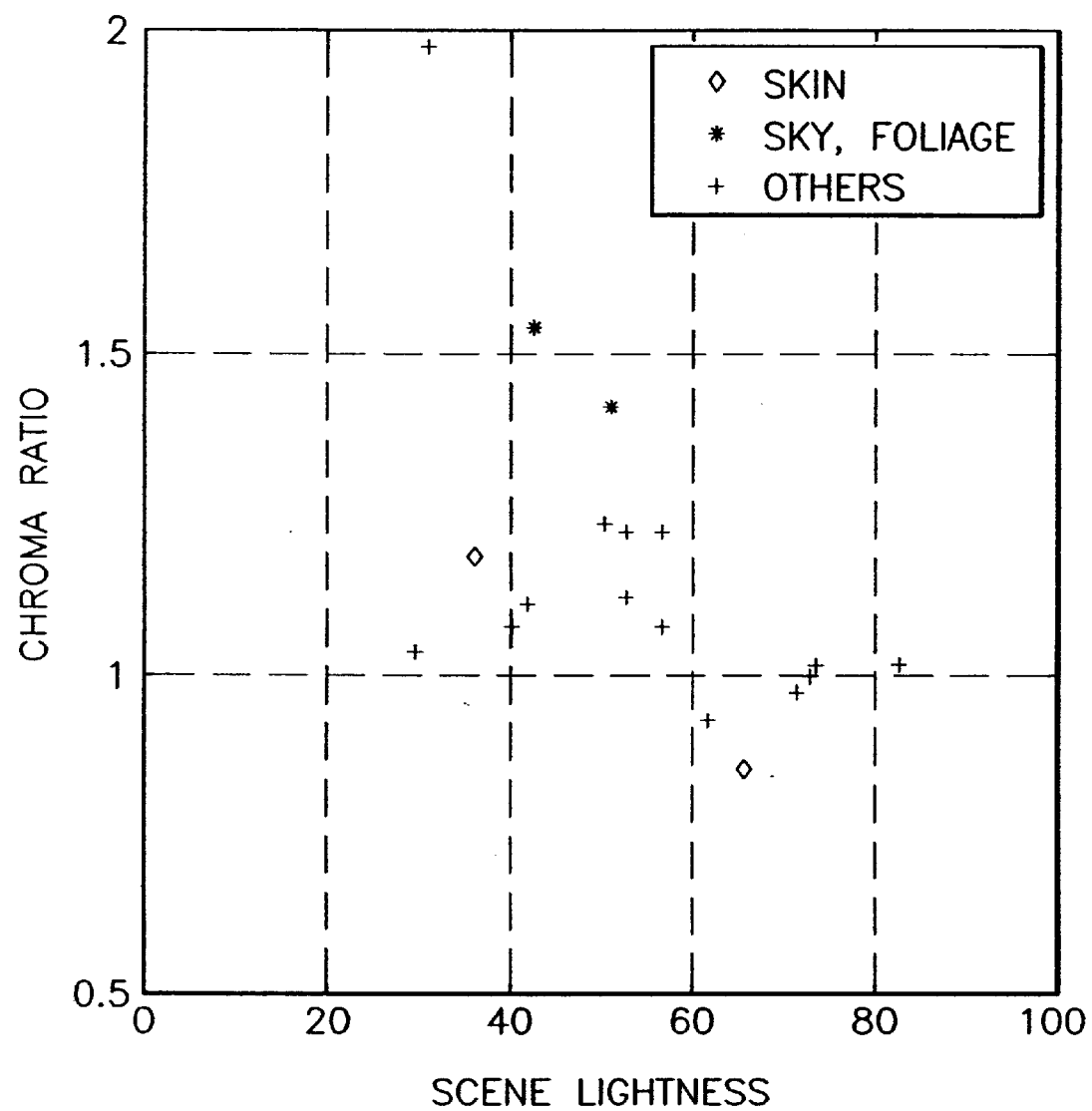
FIG. 16 is a plot showing the CIELAB chroma ratio of reproduced colors relative to the scene colors of a Macbeth Color Checker for a system where chroma manipulations were carried out according to the present invention.

FIGS. 15 and 16 show the CIE 1976 a,b chroma ratio of the reproduced colors relative to the scene colors of Macbeth Color Checker as a function of the original lightness of the patch. FIG. 15 illustrates the data for a conventional system that does not follow the rules of chroma manipulation specified above. FIG. 16 depicts an improved system where chroma manipulation was carried out according to the limits given in this invention. Both systems are intended for reflection print viewing.

Lightness Manipulation

In addition to the hue and chroma manipulations listed above, a tone scale has to be applied to map the relative luminance values of scene colors to relative luminance values of the reproduced colors. It is well known in the art that this is rarely a 1:1 mapping. The selection of a tone scale that produces the most preferred images depends on a variety of factors, including the discrepancy between viewing conditions of the scene and the reproduction, anticipated subject matter (e.g. portrait photography, outdoor photography), the dynamic range of the scene in relation to the dynamic range that can be reproduced, and viewer preferences.

Figure 17:
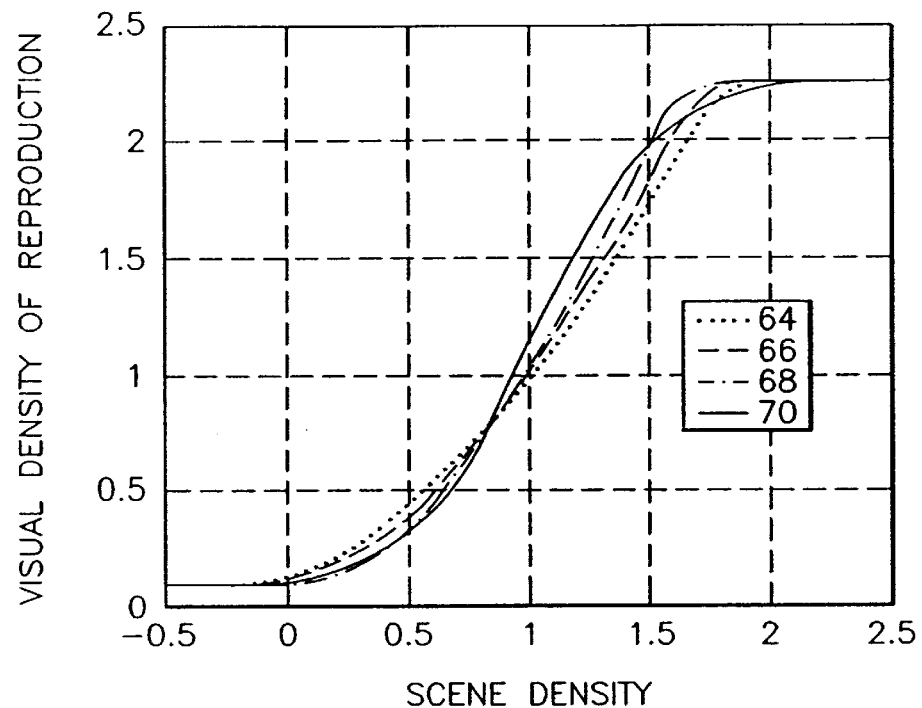
FIG. 17 is a plot showing a range of suitable tone scales for a consumer photography system that produces reflection prints
Figure 18:
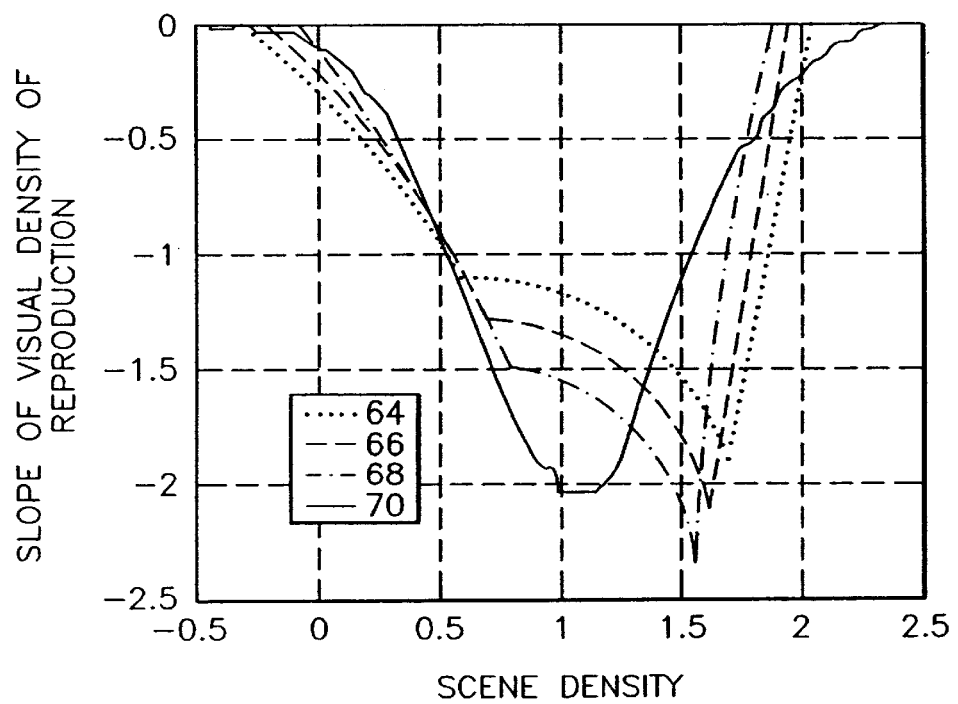
FIG. 18 is a plot showing the slopes of the tone scales shown in FIG. 17.

A family of tone scales that produce preferred reproductions in combination with the hue and chroma manipulations described above, was defined by Buhr et al. in U.S. Pat. No. 5,300,381. However, the invention is not limited to these tone scales that are characterized by a linear relationship between scene lightness and lightness as perceived by the viewer. We found that the traditional S-shaped tone scales, which are mostly used in conventional silver halide photography, also produce more preferred images within the framework of this invention compared with current color reproduction systems, because of the large improvements in hue reproduction. FIG. 17 shows four examples 64, 66, 68 and 70 of suitable tone scales for a consumer photography system that produces reflection prints. Visual optical density of the reproduction is shown as a function of scene density. In the discussion below, contrast refers to the slope of these curves at a scene density of 1 as shown in FIG. 18. All of these global lightness transformations described above increase the contrast of the image.

The best results are obtained if a particular tone scale, or a family of tone scales, is combined with a classification algorithm that selects the most appropriate tone scale according to the dynamic range of the scene or if a dynamic range adjustment is applied prior to tone scaling. Successful classification algorithms will take many forms, including but not limited to histograms, ranges, parameters based on the distribution, or transformations of the distribution of all or a subset of the recorded or transformed image pixel values. For example, one may define the dynamic range of the original scene by the log exposure density difference between the 5th and 95th percentile log exposure densities for the cumulative pixel log exposure density distribution. If the log exposure density difference is greater than 1.5, the best preferred viewed final image reproduction will have a mapping in the range bounded by tone scales 64 and 66 in FIG. 17. If the difference is less than 1.5 log exposure density units, the best preferred viewed final image reproduction will have a mapping in the range bounded by tone scales 66–70. In another example, hazy scenes will in general require a tone mapping in the range bounded by tone scales 68 and 70 for the most preferred reproductions.

In digital imaging printing systems, classification algorithms can be implemented to select slightly different tone mappings to create the most preferred images. The input for the classification can be scene parameters or capture conditions.

Information accompanying the captured original scene parameters that describes the camera parameters responsible for capturing the scene can provide useful input for the signal processing algorithms. Useful information includes any single or any combination of scene illumination type, flash parameters such as flash output and/or whether the flash was directed at the subject or bounced onto the subject and/or whether the sufficient flash power was available to properly illuminate the subject, camera lens f-stop, camera exposure time, scene orientation and zoom lens status.

Figure 19:
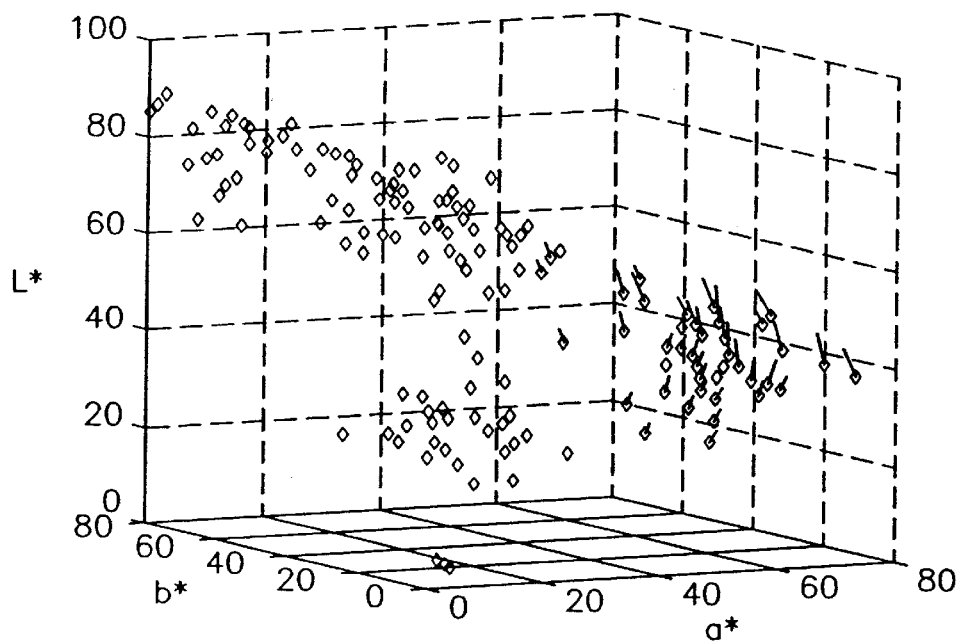
FIG. 19 is a plot showing a preferred color transformation for red colors reproduced on a silver halide reflection medium.

In addition, we have found that local lightness manipulation in certain regions of color space may provide images that are even more preferred by the viewer. For example, the colorfuilness of red colors reproduced on a silver halide reflective medium can be increased if the lightness of the scene colors within a distance of 20 CIE 1976 a,b chroma units and at last 15 CIE 1976 lightness units from the Macbeth Color Checker red patch is lowered compared with the global tone scale. Again, this transformation is required to be smooth in the sense that the reproduced lightness must be a continuous function of CIE 1976 lightness, hue angle and chroma. An example of such a transformation is shown in FIG. 19.

In combination with the hue and chroma manipulations described above, lightness manipulations can take any of the following forms:

1. Applying a scene-dependent tone scale transformation.
2. Applying a global scene-independent tone scale transformation.
3. Applying a global scene-dependent or scene-independent tone scale transformation and altering the lightness of any region of color space smoothly and consistently with a maximum CIE 1976 lightness difference of 3–10 compared with the result that would be obtained from the global tone scale transformation, whereby, expressed in terms of CIELAB for CIE Standard Illuminant D50, the region is bounded by hue lines of 10–40 degrees below and above the CIE 1976 a,b hue angle of any of the 11 high chroma patches of the Macbeth Color Checker and include colors that differ by at least 10 CIE 1976 a,b chroma and lightness units from the one of these patches.
4. All lightness transformations are performed such that the reproduced lightness is a continuous function of the scene CIE 1976 lightness, hue angle and chroma.

FIG. 2, Step (14)—Creation of the Visual Reproduction

The last step 14 in FIG. 2 is to create a visual representation of the image that was processed according to the specifications in steps 10 and 12. The image can be reproduced on any transparent or reflective material (hardcopy) or on a self-luminous display (softcopy) that produce images by additively mixing at least three suitably chosen primary colors or by subtractively mixing at least three suitably chosen dyes.

In this final step, a digital representation of the scene is transformed into an analog signal of the correct intensity and spectral distribution in order to generate the desired visual reproduction of the scene. Images may be displayed in two- or three-dimensional form. Examples of this procedure include the display of an image on a color monitor or an electronic printing process whereby a color photographic paper receives an image-wise exposure in a laser printing device and the material is subsequently developed in an RA4 process to produce a reflection print.

In most cases the digital representation of the scene that is the result of applying steps 10 and 12 must be transformed into a corresponding set of device code values to account for the scene parameter manipulation characteristics of the output device and media. The transformation between device code values and the colorimetry of the colors reproduced by a particular device/media combination can be obtained by a device characterization. An example of a device characterization is a procedure that involves generating and printing or displaying a suitable array of device code values in the form of color patches of a size large enough for subsequent measurement. These patches can be measured using a colorimeter, a spectrophotometer or a telespectroradiometer, depending on the nature of the display. If spectra are measured, CIE XYZ values and other related quantities such as CIELAB or CIELUV values can be calculated for the display illuminant using standard colorimetric procedures. This data set can be used to construct the appropriate sequence of one-dimensional look-up tables, multidimensional look-up tables, matrices, polynomials and scalars that accomplishes that transformation of the digital representation of the scene resulting from step 12 into a set of device code values that produces this desired visual representation of the scene. Another example of the implementation of this transformation is an ICC profile that maps the specifications of the desired visual reproduction, encoded in profile connection space (PCS) to device code values.

This operation may also include gamut mapping. The color gamut of the scene representation at the end of step 2 is determined by the set of primaries that was used for encoding the data. Examples include the primaries corresponding to the color-matching functions of the CIE 1931 Standard Colorimetric Observer or any linear combinations thereof. Gamut mapping is performed between the gamut defined by this encoding and the gamut of the output device/media combination. The preferred gamut mapping algorithms used in combination with this invention are those that maintain hue.

From an imaging processing point of view, the data transformation of step 14 can be combined. with any of the transformations in step 10 and 12 to form a single set of one-dimensional look-up tables, multidimensional look-up tables, matrices, polynomials and scalars in any sequence. Reproductions according to the specifications of this invention can be produced by a variety of technologies. Reproductions can be obtained on silver halide or other light-sensitive materials.

The light-sensitive material can be transparent film, reflective paper, or semi-transparent film. These materials are exposed by visible or infrared light derived from many different sources. The materials may be designed for typical photofinishing applications or they may be specially designed for digital printing applications. The photo-sensitive materials respond primarily to three different spectral regions of incident light. Typically, these are red (600–720 nm), green (500–600 nm), and blue (400–500 nm)

light. However, any combination of three different spectral sensitivities can be used. These could include green, red, and infrared light or red, infrared 1, and infrared 2 light, or 3 infrared lights of different wavelengths. Or a material sensitive the three primary wavelengths of visible light may be false sensitized so that the color of the exposing light does not produce image dye of the complementary hue, such as red, green, and blue sensitivity producing magenta, yellow, and cyan dye, respectively. Printing can be effected by exposing all pixels sequentially, by exposing a small array of pixels at the same time, or by exposing all the pixels in the image at the same time.

Devices which can be used to print on light-sensitive materials include CRT, LED (Light Emitting Diode), LVT (Light Valve Technology), LCD, Laser, as well as any other controlled optical light generating device. All these devices have the ability to expose 3 or more light-sensitive layers in a light-sensitive material to produce a colored image. They differ mainly in the technology on which the devices are based. A suitable embodiment of a CRT printer is the Kodak Digital Science LF CRT Color Printer which can be used in combination with Kodak Professional Digital III Color Paper.

Non-light-sensitive imaging materials are conveniently used by electronic printing processes to produce high-quality reproductions. The printing process can be based on many technologies. The method of image formation can be half-tone, continuous tone, or complete material transfer. The imaging material can be transparent film, reflective paper, or semi-transparent film. The materials can be written on to produce pictorial images by thermal dye transfer, ink jet, wax, electrophotographic, or other pixelwise writing techniques. These processes use three or more colorants to create colored pictorial representations of pictorial scenes. The colorants may be dyes, toner, inks, or any other permanent or semi-permanent colored material. A suitable embodiment of a thermal printer is the Kodak XLS 8650 thermal dye transfer printer.

In addition to hardcopy viewed images, it is also possible to create projected images which have the same preference over previously generated pictorial images. Many technologies are appropriate for this kind of image generation. All these techniques rely on producing color images with 2 or more colored lights. These are typically red, green, and blue in nature although they can be any set of primaries. Devices which can be used to create the preferred viewed reproduction include CRT, LCD, EL (Electro-Luminescence), LED, OLED (organic LEDs), light bulbs, lasers, plasma display panels, or any other three or more colored lighting apparatus capable of pixelwise illumination. The images can be created by display within the device, projection, or backlighting. Many devices create an image on a screen or display area which is physically a part of the mechanical unit. However, images can also be created by optically projecting the image in the form of light rays from behind or in front of the viewer toward a screen which is in front of a viewer or by projecting a reversed image toward the viewer onto a screen between the viewer and the projecting device. A suitable embodiment of a CRT display is a Sony Trinitron CRT.

Testing

Figure 20:
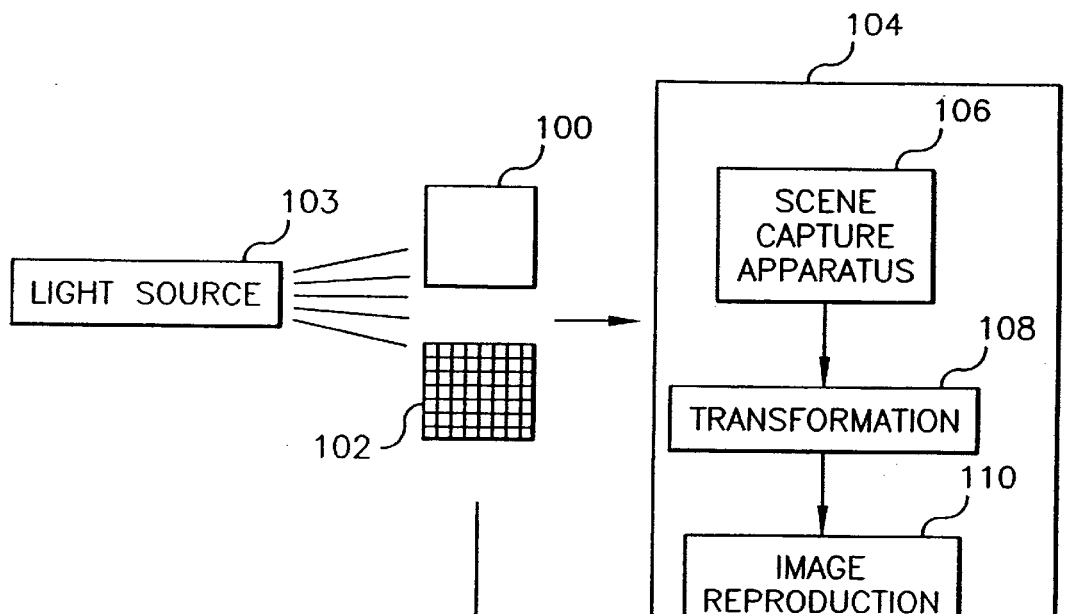
FIG. 20 is a block diagram illustrating a testing procedure for determining the color and tone reproduction of an image reproduction system.

A test procedure for determining the color and tone reproduction of an image reproduction system in the case of hardcopy reflection prints will be described in reference to FIG. 20. In this test procedure, two test targets 100, 102 of uniform size are provided. Target 100 is a spectrally uniform gray, i.e. it exhibits constant percent reflectance (20%) in a wavelength spectrum of from 380 nm to 780 nm. Target 102 is the Macbeth Color Checker. Both targets are large enough so that when photographed as described below, each target substantially fills the image capture area of the capture device.

A lighting system 103 is provided to uniformly illuminate the targets, mounted on a uniform gray (20% reflectance) background, at approximately a 45° angle of incidence. The lighting should provide reasonably specular illumination typical of high quality, low flare viewing conditions. The spectral quality of the lighting should be similar to that for which the imaging system under test is designed. Under constant illumination conditions from lighting system 103 and with a scene capture apparatus 106, e.g. a photographic camera, oriented perpendicularly to the targets, each of the target images is captured according to ISO standards for the image capture device. Additionally, the reflection spectra of each color patch in target 102 and the corresponding area of target 100 are measured using a very low flare telespectroradiometer. A suitable embodiment is the Photo Research telespectroradiometer 705. Each measurement is made with a spot size one-fourth as large as the density step area being measured. Using identical lighting, image device and radiometer conditions, target 100 is captured and measured as described above.

Using the imaging system 104 under analysis including scene capture apparatus 106 and image reproduction stage 110 and having an overall transformation characteristic represented by transformation step 108, a hardcopy reproduction of the target images is produced by a suitable output device. The reproduction is made in such a manner that the N/3.5 Grey patch in the reproduction match those of the original N/3.5 Grey Patch. A 1.0 scene density relative to a 100% diffuse reflector is reproduced at a density of 1.0±0.05.

The reproduced prints are uniformly illuminated with lighting system 103 at a 45° angle of incidence and the visual step densities are measured with the very low flare radiometer 116. It will be understood that the targets and reproductions preferably are illuminated and measured under identical conditions. These measurements include the target and reproduction illuminant. If this is not the desired capture and viewing illuminant, the illuminant spectrum can be divided out, if the spectral reflectance of one of the neutral target patches in target 102 is known. CIE XYZ values for all patches are calculated from the target and reproduction reflectance spectra, the spectrum of the illuminant, and the CIE color-matching functions of the observer, using standard methods. Before proceeding, the measured XYZ values on the target 102 have to be corrected for any target illumination non-uniformity using the target 100 measurements in the same location as the target 102 steps. Likewise, the measured step XYZ values on target 112, the reproduction of target 102, must be corrected for any target illumination non-uniformity, any field exposure non-uniformity by the scene capture apparatus 106 onto the film or sensor and any field exposure non-uniformities present in the image reproduction apparatus 110 using target 114. CIELAB values for the target and the reproduction, referring to the CIE Standard Illuminant D50, are calculated using standard procedures. The relative spectral power distribution of the illuminant and the reflection spectra of the patches of the Macbeth Color Checker Chart used in our test procedure, are summarized in Table 1 below. Table 2 lists the corresponding CIE 1976 CIELAB values for CIE Standard Illuminant D50.

TABLE 1

| wl [nm] | dark skin | light skin | blue sky | foilage | blue flower | blueish green | orange | purplish blue | moderate red | purple | yellow green | Orange yellow |
|---|---|---|---|---|---|---|---|---|---|---|---|---|
| 380 | 0.0444 | 0.0957 | 0.1042 | 0.0447 | 0.1124 | 0.1033 | 0.0481 | 0.0891 | 0.0908 | 0.08 | 0.0543 | 0.0535 |
| 385 | 0.0465 | 0.1124 | 0.1267 | 0.0452 | 0.1386 | 0.1245 | 0.0488 | 0.1086 | 0.1041 | 0.0958 | 0.0564 | 0.0548 |
| 390 | 0.0502 | 0.134 | 0.1612 | 0.0459 | 0.1816 | 0.1573 | 0.0494 | 0.138 | 0.12 | 0.1182 | 0.059 | 0.0568 |
| 395 | 0.0556 | 0.1598 | 0.2058 | 0.0471 | 0.2421 | 0.2002 | 0.0502 | 0.1783 | 0.1354 | 0.1449 | 0.0612 | 0.0581 |
| 400 | 0.0614 | 0.183 | 0.2527 | 0.0478 | 0.3097 | 0.2445 | 0.0505 | 0.2206 | 0.1459 | 0.1706 | 0.0627 | 0.059 |
| 405 | 0.0659 | 0.1984 | 0.2917 | 0.0483 | 0.374 | 0.2817 | 0.0503 | 0.2608 | 0.1508 | 0.1921 | 0.064 | 0.0596 |
| 410 | 0.0681 | 0.2069 | 0.319 | 0.0489 | 0.4205 | 0.3065 | 0.0504 | 0.292 | 0.151 | 0.2056 | 0.065 | 0.0603 |
| 415 | 0.0678 | 0.2099 | 0.3334 | 0.0494 | 0.4459 | 0.3207 | 0.0503 | 0.314 | 0.1493 | 0.2115 | 0.0657 | 0.0608 |
| 420 | 0.0661 | 0.2115 | 0.3407 | 0.0502 | 0.4592 | 0.3299 | 0.0505 | 0.3304 | 0.1457 | 0.2113 | 0.0664 | 0.0607 |
| 425 | 0.0634 | 0.2118 | 0.3425 | 0.051 | 0.462 | 0.3379 | 0.0498 | 0.3414 | 0.1421 | 0.2063 | 0.0676 | 0.061 |
| 430 | 0.0608 | 0.2149 | 0.3418 | 0.052 | 0.4637 | 0.3436 | 0.0495 | 0.3533 | 0.1393 | 0.1992 | 0.0689 | 0.0614 |
| 435 | 0.0586 | 0.2156 | 0.3412 | 0.0529 | 0.4607 | 0.3521 | 0.0495 | 0.3652 | 0.1379 | 0.1869 | 0.0707 | 0.0617 |
| 440 | 0.0564 | 0.2187 | 0.3404 | 0.0546 | 0.4567 | 0.3597 | 0.0495 | 0.3772 | 0.1372 | 0.1731 | 0.0719 | 0.0624 |
| 445 | 0.0544 | 0.2218 | 0.3383 | 0.0563 | 0.4496 | 0.3694 | 0.0498 | 0.3871 | 0.1362 | 0.1599 | 0.0753 | 0.063 |
| 450 | 0.0533 | 0.2273 | 0.3354 | 0.0585 | 0.4461 | 0.3807 | 0.0497 | 0.3916 | 0.1344 | 0.1464 | 0.0787 | 0.0634 |
| 455 | 0.0527 | 0.2338 | 0.3307 | 0.0601 | 0.436 | 0.394 | 0.0498 | 0.3869 | 0.133 | 0.1339 | 0.083 | 0.0647 |
| 460 | 0.0525 | 0.2405 | 0.3257 | 0.0619 | 0.4284 | 0.4102 | 0.0504 | 0.3797 | 0.1316 | 0.1208 | 0.0887 | 0.0668 |
| 465 | 0.0525 | 0.2512 | 0.3214 | 0.0637 | 0.42 | 0.4347 | 0.0511 | 0.3664 | 0.1309 | 0.1097 | 0.0972 | 0.07 |
| 470 | 0.0526 | 0.2604 | 0.3145 | 0.0652 | 0.4148 | 0.459 | 0.0515 | 0.3512 | 0.1303 | 0.101 | 0.1061 | 0.0738 |
| 475 | 0.0529 | 0.2709 | 0.3077 | 0.0661 | 0.4023 | 0.4842 | 0.0521 | 0.3325 | 0.1287 | 0.0927 | 0.1178 | 0.0793 |
| 480 | 0.0536 | 0.2811 | 0.2979 | 0.0675 | 0.388 | 0.515 | 0.053 | 0.307 | 0.1253 | 0.0853 | 0.1345 | 0.0869 |
| 485 | 0.0552 | 0.2887 | 0.29 | 0.0688 | 0.3757 | 0.5437 | 0.0541 | 0.2815 | 0.1201 | 0.079 | 0.1557 | 0.0959 |
| 490 | 0.0566 | 0.2947 | 0.2812 | 0.0705 | 0.3669 | 0.5657 | 0.0552 | 0.2553 | 0.1148 | 0.0735 | 0.1821 | 0.1037 |
| 495 | 0.0586 | 0.2979 | 0.2722 | 0.0724 | 0.3566 | 0.5862 | 0.0567 | 0.2284 | 0.1108 | 0.0688 | 0.2158 | 0.112 |
| 500 | 0.0604 | 0.3038 | 0.2647 | 0.0769 | 0.3458 | 0.5935 | 0.0582 | 0.2057 | 0.1072 | 0.0647 | 0.2573 | 0.1202 |
| 505 | 0.0624 | 0.3123 | 0.2542 | 0.0855 | 0.3324 | 0.5966 | 0.0611 | 0.1853 | 0.1056 | 0.0614 | 0.3112 | 0.1287 |
| 510 | 0.0646 | 0.3203 | 0.2466 | 0.1003 | 0.3174 | 0.5959 | 0.0655 | 0.1699 | 0.104 | 0.059 | 0.3683 | 0.1414 |
| 515 | 0.0669 | 0.3241 | 0.2377 | 0.1216 | 0.2989 | 0.5908 | 0.0721 | 0.1535 | 0.1019 | 0.0572 | 0.4266 | 0.1584 |
| 520 | 0.0692 | 0.3237 | 0.2292 | 0.1442 | 0.2787 | 0.5861 | 0.0817 | 0.1384 | 0.0984 | 0.0557 | 0.478 | 0.1816 |
| 525 | 0.072 | 0.3148 | 0.2194 | 0.1645 | 0.2552 | 0.5759 | 0.095 | 0.1253 | 0.0949 | 0.0545 | 0.5158 | 0.2133 |
| 530 | 0.0743 | 0.3031 | 0.2113 | 0.1764 | 0.2378 | 0.5639 | 0.1123 | 0.1147 | 0.0927 | 0.0524 | 0.5395 | 0.2548 |
| 535 | 0.0758 | 0.2936 | 0.2046 | 0.1815 | 0.2242 | 0.55 | 0.1351 | 0.1084 | 0.0923 | 0.0514 | 0.5553 | 0.3028 |
| 540 | 0.0771 | 0.2917 | 0.2 | 0.1796 | 0.2153 | 0.5348 | 0.1611 | 0.1036 | 0.0938 | 0.0505 | 0.5623 | 0.3561 |
| 545 | 0.0783 | 0.2953 | 0.1954 | 0.1715 | 0.2108 | 0.513 | 0.1899 | 0.0997 | 0.0973 | 0.0501 | 0.5579 | 0.4048 |
| 550 | 0.0796 | 0.2999 | 0.1927 | 0.1618 | 0.2088 | 0.4934 | 0.2205 | 0.0953 | 0.102 | 0.0504 | 0.5518 | 0.4479 |
| 555 | 0.0813 | 0.2997 | 0.188 | 0.1523 | 0.2074 | 0.4691 | 0.2531 | 0.0913 | 0.1072 | 0.0509 | 0.5443 | 0.483 |
| 560 | 0.0843 | 0.2973 | 0.1827 | 0.1418 | 0.2038 | 0.4448 | 0.2868 | 0.0869 | 0.1109 | 0.0516 | 0.5292 | 0.5103 |
| 565 | 0.089 | 0.2975 | 0.1776 | 0.1329 | 0.1994 | 0.4218 | 0.3252 | 0.0832 | 0.1129 | 0.0522 | 0.516 | 0.5364 |
| 570 | 0.0946 | 0.303 | 0.1727 | 0.1281 | 0.1957 | 0.4001 | 0.3661 | 0.0809 | 0.1163 | 0.0518 | 0.5014 | 0.5572 |
| 575 | 0.1015 | 0.3174 | 0.168 | 0.1262 | 0.1965 | 0.3761 | 0.4066 | 0.0793 | 0.1273 | 0.0512 | 0.4841 | 0.5716 |
| 580 | 0.1083 | 0.3455 | 0.1633 | 0.1254 | 0.2025 | 0.3538 | 0.4432 | 0.0798 | 0.1521 | 0.0505 | 0.4664 | 0.5829 |
| 585 | 0.1159 | 0.3816 | 0.1591 | 0.1221 | 0.2094 | 0.332 | 0.4713 | 0.0813 | 0.1945 | 0.05 | 0.4504 | 0.5946 |
| 590 | 0.1226 | 0.4184 | 0.1558 | 0.1184 | 0.2176 | 0.3116 | 0.4957 | 0.0828 | 0.2534 | 0.0505 | 0.4289 | 0.6048 |
| 595 | 0.1277 | 0.4528 | 0.1522 | 0.1132 | 0.2249 | 0.2888 | 0.5156 | 0.0839 | 0.3219 | 0.0519 | 0.4108 | 0.6139 |
| 600 | 0.1326 | 0.4828 | 0.1494 | 0.1079 | 0.2322 | 0.2684 | 0.5311 | 0.0843 | 0.3899 | 0.0547 | 0.3912 | 0.6226 |
| 605 | 0.1359 | 0.5043 | 0.1469 | 0.1037 | 0.2395 | 0.2504 | 0.5435 | 0.0844 | 0.454 | 0.0603 | 0.3717 | 0.632 |
| 610 | 0.1403 | 0.525 | 0.1434 | 0.1008 | 0.2443 | 0.2363 | 0.5549 | 0.0841 | 0.5044 | 0.0679 | 0.356 | 0.6394 |
| 615 | 0.1446 | 0.5356 | 0.1402 | 0.0999 | 0.2463 | 0.2272 | 0.5641 | 0.0827 | 0.5357 | 0.0782 | 0.3462 | 0.6445 |
| 620 | 0.1479 | 0.5438 | 0.1365 | 0.1005 | 0.2456 | 0.2209 | 0.5725 | 0.0822 | 0.5595 | 0.0908 | 0.3403 | 0.6525 |
| 625 | 0.1522 | 0.5517 | 0.1337 | 0.1014 | 0.2443 | 0.2163 | 0.5806 | 0.0822 | 0.5741 | 0.1045 | 0.3343 | 0.6592 |
| 630 | 0.1557 | 0.5574 | 0.1289 | 0.1022 | 0.2446 | 0.2117 | 0.5853 | 0.0838 | 0.5856 | 0.1187 | 0.3293 | 0.6634 |
| 635 | 0.1605 | 0.5612 | 0.1254 | 0.1013 | 0.2489 | 0.2098 | 0.592 | 0.0863 | 0.5886 | 0.132 | 0.327 | 0.6655 |
| 640 | 0.1647 | 0.5616 | 0.122 | 0.1002 | 0.2592 | 0.2075 | 0.5968 | 0.0908 | 0.5886 | 0.1451 | 0.3261 | 0.6717 |
| 645 | 0.1702 | 0.5696 | 0.1191 | 0.0989 | 0.2774 | 0.2064 | 0.6004 | 0.0967 | 0.5942 | 0.1582 | 0.3231 | 0.678 |
| 650 | 0.1769 | 0.5808 | 0.1161 | 0.0982 | 0.3006 | 0.2057 | 0.6042 | 0.1025 | 0.5979 | 0.1706 | 0.3205 | 0.6852 |
| 655 | 0.1843 | 0.5843 | 0.1141 | 0.0979 | 0.3276 | 0.2052 | 0.6121 | 0.1089 | 0.5957 | 0.1831 | 0.3239 | 0.688 |
| 660 | 0.1941 | 0.594 | 0.112 | 0.0973 | 0.3604 | 0.2078 | 0.6166 | 0.1156 | 0.5987 | 0.1971 | 0.3279 | 0.6925 |
| 665 | 0.2018 | 0.6008 | 0.1102 | 0.0988 | 0.3915 | 0.2128 | 0.6231 | 0.12 | 0.5986 | 0.2117 | 0.3328 | 0.6963 |
| 670 | 0.2118 | 0.6143 | 0.1079 | 0.1019 | 0.4182 | 0.2177 | 0.6269 | 0.1227 | 0.5968 | 0.2259 | 0.3384 | 0.7015 |
| 675 | 0.2196 | 0.6252 | 0.1067 | 0.1077 | 0.4424 | 0.2228 | 0.6277 | 0.1212 | 0.5951 | 0.2416 | 0.3457 | 0.7027 |
| 680 | 0.2287 | 0.6371 | 0.1051 | 0.1183 | 0.4632 | 0.2307 | 0.6315 | 0.1185 | 0.5943 | 0.2617 | 0.3538 | 0.704 |
| 685 | 0.2367 | 0.6504 | 0.1038 | 0.1342 | 0.4749 | 0.2361 | 0.6366 | 0.1152 | 0.592 | 0.2804 | 0.3628 | 0.706 |
| 690 | 0.2439 | 0.668 | 0.1035 | 0.1533 | 0.4817 | 0.2403 | 0.6371 | 0.1135 | 0.5918 | 0.2976 | 0.369 | 0.7145 |
| 695 | 0.2521 | 0.6858 | 0.1021 | 0.1788 | 0.4886 | 0.244 | 0.6421 | 0.1114 | 0.5906 | 0.3202 | 0.3748 | 0.7135 |
| 700 | 0.2623 | 0.7005 | 0.1022 | 0.2111 | 0.4941 | 0.2488 | 0.6445 | 0.111 | 0.5927 | 0.3421 | 0.3804 | 0.7145 |
| 705 | 0.2712 | 0.7215 | 0.1013 | 0.2429 | 0.4971 | 0.2518 | 0.6487 | 0.1116 | 0.5933 | 0.367 | 0.3852 | 0.7179 |
| 710 | 0.2822 | 0.7386 | 0.1009 | 0.2705 | 0.495 | 0.252 | 0.6519 | 0.1137 | 0.5894 | 0.3903 | 0.3858 | 0.7234 |
| 715 | 0.2905 | 0.757 | 0.1005 | 0.2905 | 0.4938 | 0.2483 | 0.6559 | 0.1166 | 0.5894 | 0.4122 | 0.3838 | 0.7256 |
| 720 | 0.3028 | 0.7723 | 0.1006 | 0.3058 | 0.4987 | 0.2463 | 0.6589 | 0.1196 | 0.5924 | 0.4373 | 0.3819 | 0.7278 |
| 725 | 0.3197 | 0.7885 | 0.0999 | 0.3187 | 0.4976 | 0.2433 | 0.6632 | 0.1244 | 0.5912 | 0.4678 | 0.3812 | 0.7299 |
| 730 | 0.3325 | 0.8017 | 0.1002 | 0.3249 | 0.4957 | 0.246 | 0.6628 | 0.13 | 0.5918 | 0.4943 | 0.3835 | 0.7308 |
| 735 | 0.344 | 0.8113 | 0.1003 | 0.3257 | 0.4936 | 0.2472 | 0.666 | 0.1359 | 0.5855 | 0.5194 | 0.3875 | 0.7345 |
| 740 | 0.3626 | 0.8226 | 0.1002 | 0.3276 | 0.4948 | 0.2548 | 0.6683 | 0.1445 | 0.5869 | 0.5539 | 0.3954 | 0.7349 |
| 745 | 0.3806 | 0.8292 | 0.1014 | 0.3325 | 0.4955 | 0.2668 | 0.6751 | 0.1586 | 0.5898 | 0.5808 | 0.4086 | 0.7395 |
| 750 | 0.3916 | 0.8437 | 0.1009 | 0.334 | 0.4968 | 0.2754 | 0.6767 | 0.1775 | 0.5902 | 0.6098 | 0.4227 | 0.7413 |

TABLE 1-continued

| wl [nm] | Blue | Green | Red | Yellow | Magenta | Cyan | white | neutral 8 | neutral 6.5 | neutral 5 | neutral 3.5 | black | D50 |
|---|---|---|---|---|---|---|---|---|---|---|---|---|---|
| 380 | 0.0586 | 0.0506 | 0.0473 | 0.0481 | 0.1036 | 0.0813 | 0.119 | 0.1122 | 0.1075 | 0.0885 | 0.0637 | 0.0263 | 0.2373 |
| 385 | 0.0668 | 0.0521 | 0.0477 | 0.0491 | 0.1267 | 0.0978 | 0.1483 | 0.1413 | 0.1308 | 0.1029 | 0.0676 | 0.0267 | 0.2634 |
| 390 | 0.0785 | 0.0538 | 0.0486 | 0.0499 | 0.1631 | 0.1206 | 0.1982 | 0.1885 | 0.167 | 0.1222 | 0.0723 | 0.027 | 0.2895 |
| 395 | 0.0948 | 0.0555 | 0.049 | 0.0512 | 0.2139 | 0.1508 | 0.2773 | 0.2595 | 0.2136 | 0.1448 | 0.0766 | 0.0275 | 0.3838 |
| 400 | 0.1138 | 0.057 | 0.0492 | 0.0519 | 0.2704 | 0.1817 | 0.3834 | 0.3458 | 0.2627 | 0.1635 | 0.0807 | 0.0275 | 0.478 |
| 405 | 0.134 | 0.0579 | 0.0492 | 0.0524 | 0.3203 | 0.2101 | 0.5122 | 0.4372 | 0.305 | 0.1782 | 0.0825 | 0.0279 | 0.5129 |
| 410 | 0.155 | 0.0581 | 0.0491 | 0.0531 | 0.3535 | 0.2321 | 0.6436 | 0.5105 | 0.332 | 0.186 | 0.0841 | 0.0282 | 0.5479 |
| 415 | 0.1727 | 0.059 | 0.0489 | 0.0539 | 0.368 | 0.2465 | 0.7433 | 0.5561 | 0.3462 | 0.191 | 0.0849 | 0.0286 | 0.565 |
| 420 | 0.188 | 0.0601 | 0.0489 | 0.0546 | 0.3738 | 0.2562 | 0.8065 | 0.5786 | 0.3516 | 0.1929 | 0.0855 | 0.0287 | 0.5821 |
| 425 | 0.203 | 0.0607 | 0.0489 | 0.055 | 0.3712 | 0.2661 | 0.8369 | 0.5814 | 0.3547 | 0.1939 | 0.0865 | 0.0286 | 0.5713 |
| 430 | 0.2224 | 0.0618 | 0.0489 | 0.0555 | 0.3632 | 0.2784 | 0.8488 | 0.5859 | 0.3558 | 0.1945 | 0.0871 | 0.0288 | 0.5606 |
| 435 | 0.2444 | 0.063 | 0.0489 | 0.0561 | 0.3526 | 0.2922 | 0.8555 | 0.5877 | 0.3571 | 0.196 | 0.0874 | 0.0287 | 0.6431 |
| 440 | 0.2705 | 0.0646 | 0.0491 | 0.057 | 0.3396 | 0.3078 | 0.8602 | 0.5869 | 0.3576 | 0.1975 | 0.0881 | 0.0287 | 0.7256 |
| 445 | 0.3001 | 0.0665 | 0.049 | 0.0578 | 0.325 | 0.3257 | 0.8638 | 0.5883 | 0.3597 | 0.1979 | 0.0887 | 0.0286 | 0.7859 |
| 450 | 0.3233 | 0.0692 | 0.0491 | 0.0589 | 0.309 | 0.3415 | 0.867 | 0.5853 | 0.3621 | 0.1979 | 0.0891 | 0.0286 | 0.8461 |
| 455 | 0.3376 | 0.0721 | 0.0489 | 0.0598 | 0.2943 | 0.3593 | 0.8682 | 0.5857 | 0.3616 | 0.1981 | 0.0889 | 0.0289 | 0.8625 |
| 460 | 0.3396 | 0.0766 | 0.0484 | 0.0628 | 0.279 | 0.3791 | 0.8698 | 0.5843 | 0.3614 | 0.1982 | 0.0887 | 0.0289 | 0.8788 |
| 465 | 0.328 | 0.0826 | 0.0478 | 0.0676 | 0.2652 | 0.3981 | 0.8712 | 0.5864 | 0.3598 | 0.1982 | 0.0888 | 0.0289 | 0.8825 |
| 470 | 0.31 | 0.0885 | 0.0473 | 0.0738 | 0.2517 | 0.4127 | 0.871 | 0.5826 | 0.3594 | 0.1978 | 0.0883 | 0.0288 | 0.8862 |
| 475 | 0.2843 | 0.0966 | 0.0465 | 0.0837 | 0.2375 | 0.4251 | 0.8768 | 0.5817 | 0.3592 | 0.1962 | 0.0878 | 0.0287 | 0.9044 |
| 480 | 0.2508 | 0.1081 | 0.0458 | 0.1021 | 0.222 | 0.4365 | 0.8766 | 0.5797 | 0.3591 | 0.1955 | 0.0873 | 0.0286 | 0.9226 |
| 485 | 0.2148 | 0.121 | 0.0455 | 0.1282 | 0.207 | 0.4388 | 0.8751 | 0.583 | 0.3576 | 0.1957 | 0.0878 | 0.0288 | 0.9073 |
| 490 | 0.1806 | 0.1355 | 0.0447 | 0.1645 | 0.1936 | 0.4363 | 0.8782 | 0.5821 | 0.3579 | 0.197 | 0.0879 | 0.0286 | 0.8921 |
| 495 | 0.149 | 0.1522 | 0.0443 | 0.2086 | 0.1814 | 0.4282 | 0.8807 | 0.5835 | 0.3586 | 0.1958 | 0.0878 | 0.0287 | 0.9104 |
| 500 | 0.1233 | 0.1724 | 0.0441 | 0.2627 | 0.1723 | 0.419 | 0.8867 | 0.5834 | 0.3579 | 0.1963 | 0.0885 | 0.0285 | 0.9286 |
| 505 | 0.1014 | 0.1998 | 0.0438 | 0.319 | 0.1625 | 0.4022 | 0.8861 | 0.5812 | 0.3578 | 0.1962 | 0.0882 | 0.0287 | 0.933 |
| 510 | 0.0855 | 0.2327 | 0.0434 | 0.3727 | 0.154 | 0.3832 | 0.8863 | 0.5813 | 0.3588 | 0.1963 | 0.0887 | 0.0286 | 0.9373 |
| 515 | 0.0731 | 0.2699 | 0.043 | 0.4208 | 0.1439 | 0.3599 | 0.8863 | 0.582 | 0.3596 | 0.1963 | 0.0889 | 0.0285 | 0.9398 |
| 520 | 0.064 | 0.3061 | 0.0429 | 0.4669 | 0.1316 | 0.3357 | 0.8872 | 0.5786 | 0.3574 | 0.196 | 0.0885 | 0.0286 | 0.9424 |
| 525 | 0.0575 | 0.3348 | 0.0431 | 0.507 | 0.1202 | 0.3112 | 0.8863 | 0.5802 | 0.3568 | 0.197 | 0.0891 | 0.0287 | 0.9665 |
| 530 | 0.0526 | 0.3553 | 0.0433 | 0.541 | 0.1123 | 0.2834 | 0.8888 | 0.58 | 0.3588 | 0.1969 | 0.0891 | 0.0287 | 0.9906 |
| 535 | 0.0496 | 0.3579 | 0.0437 | 0.5687 | 0.1069 | 0.2575 | 0.8907 | 0.5795 | 0.3581 | 0.1967 | 0.0893 | 0.0287 | 0.9841 |
| 540 | 0.0471 | 0.354 | 0.0439 | 0.5943 | 0.1058 | 0.2315 | 0.8921 | 0.5805 | 0.3579 | 0.1963 | 0.0889 | 0.0288 | 0.9776 |
| 545 | 0.0453 | 0.3439 | 0.0441 | 0.6108 | 0.1062 | 0.2074 | 0.8878 | 0.5783 | 0.3579 | 0.197 | 0.0892 | 0.0286 | 0.9852 |
| 550 | 0.0441 | 0.3267 | 0.0446 | 0.6275 | 0.1085 | 0.1848 | 0.8884 | 0.58 | 0.3593 | 0.1965 | 0.0891 | 0.0288 | 0.9928 |
| 555 | 0.0432 | 0.3082 | 0.0458 | 0.6464 | 0.1094 | 0.1623 | 0.8908 | 0.5794 | 0.3565 | 0.1973 | 0.0895 | 0.0287 | 0.9816 |
| 560 | 0.0424 | 0.2876 | 0.0473 | 0.658 | 0.1086 | 0.143 | 0.8863 | 0.5794 | 0.3578 | 0.1982 | 0.0897 | 0.0285 | 0.9704 |
| 565 | 0.0415 | 0.266 | 0.0496 | 0.6681 | 0.1088 | 0.126 | 0.8861 | 0.58 | 0.3583 | 0.1982 | 0.0897 | 0.0286 | 0.9594 |
| 570 | 0.0414 | 0.2449 | 0.053 | 0.6808 | 0.1128 | 0.113 | 0.8892 | 0.584 | 0.3609 | 0.1985 | 0.0902 | 0.0286 | 0.9484 |
| 575 | 0.041 | 0.2238 | 0.0574 | 0.6882 | 0.1211 | 0.1035 | 0.8892 | 0.5835 | 0.36 | 0.2003 | 0.0902 | 0.0287 | 0.9542 |
| 580 | 0.0407 | 0.2052 | 0.0658 | 0.6992 | 0.1366 | 0.0951 | 0.8863 | 0.5816 | 0.3602 | 0.201 | 0.0906 | 0.0285 | 0.9599 |
| 585 | 0.0407 | 0.1855 | 0.079 | 0.7076 | 0.1593 | 0.0897 | 0.8923 | 0.5818 | 0.3593 | 0.2007 | 0.0908 | 0.0289 | 0.9337 |
| 590 | 0.0406 | 0.1666 | 0.0995 | 0.7145 | 0.1879 | 0.0849 | 0.8925 | 0.5837 | 0.3617 | 0.2005 | 0.091 | 0.0287 | 0.9074 |
| 595 | 0.0403 | 0.1492 | 0.1312 | 0.7226 | 0.2229 | 0.0811 | 0.8902 | 0.584 | 0.3601 | 0.2013 | 0.091 | 0.0287 | 0.9277 |
| 600 | 0.0406 | 0.1323 | 0.1747 | 0.7251 | 0.2627 | 0.0774 | 0.8872 | 0.5834 | 0.3593 | 0.2014 | 0.0904 | 0.0286 | 0.9481 |
| 605 | 0.0407 | 0.1173 | 0.2315 | 0.7331 | 0.3107 | 0.0747 | 0.8891 | 0.5846 | 0.36 | 0.2004 | 0.0902 | 0.0285 | 0.9558 |
| 610 | 0.0408 | 0.1049 | 0.3002 | 0.7417 | 0.3658 | 0.0723 | 0.8921 | 0.5805 | 0.3589 | 0.2008 | 0.0904 | 0.0285 | 0.9635 |
| 615 | 0.041 | 0.0965 | 0.3739 | 0.7498 | 0.4294 | 0.0705 | 0.8958 | 0.5828 | 0.3588 | 0.2007 | 0.0903 | 0.0288 | 0.9624 |
| 620 | 0.041 | 0.0902 | 0.4494 | 0.7589 | 0.4914 | 0.0705 | 0.8941 | 0.581 | 0.3576 | 0.2002 | 0.0904 | 0.0288 | 0.9613 |
| 625 | 0.0411 | 0.0863 | 0.5116 | 0.7631 | 0.5491 | 0.07 | 0.8949 | 0.582 | 0.3574 | 0.2003 | 0.0897 | 0.0289 | 0.9452 |
| 630 | 0.0413 | 0.083 | 0.5647 | 0.7663 | 0.6042 | 0.0693 | 0.8941 | 0.5786 | 0.3556 | 0.1991 | 0.0891 | 0.0289 | 0.9291 |
| 635 | 0.0416 | 0.081 | 0.6068 | 0.7744 | 0.6491 | 0.0693 | 0.8938 | 0.5783 | 0.3543 | 0.1973 | 0.0889 | 0.0288 | 0.9444 |
| 640 | 0.0421 | 0.0791 | 0.6336 | 0.7762 | 0.6861 | 0.0695 | 0.8941 | 0.577 | 0.3525 | 0.1971 | 0.0885 | 0.029 | 0.9596 |
| 645 | 0.0427 | 0.0769 | 0.6514 | 0.7814 | 0.7199 | 0.0699 | 0.8978 | 0.5764 | 0.3533 | 0.1972 | 0.088 | 0.0291 | 0.9442 |
| 650 | 0.0428 | 0.0752 | 0.6674 | 0.7881 | 0.7417 | 0.0705 | 0.8974 | 0.5768 | 0.3516 | 0.1965 | 0.0883 | 0.0294 | 0.9287 |
| 655 | 0.0432 | 0.0745 | 0.6793 | 0.7944 | 0.7624 | 0.0713 | 0.8991 | 0.5769 | 0.352 | 0.1955 | 0.0885 | 0.0298 | 0.941 |
| 660 | 0.044 | 0.0741 | 0.6836 | 0.8006 | 0.782 | 0.0728 | 0.9024 | 0.5762 | 0.3509 | 0.1961 | 0.0885 | 0.0302 | 0.9532 |
| 665 | 0.0444 | 0.0743 | 0.6895 | 0.8008 | 0.7943 | 0.0742 | 0.9034 | 0.5788 | 0.3498 | 0.1956 | 0.0886 | 0.0304 | 0.9766 |
| 670 | 0.0442 | 0.075 | 0.695 | 0.8035 | 0.7984 | 0.075 | 0.9036 | 0.5733 | 0.3499 | 0.1938 | 0.0879 | 0.0304 | 1.0000 |
| 675 | 0.0442 | 0.075 | 0.6991 | 0.807 | 0.8019 | 0.0744 | 0.9026 | 0.5744 | 0.3478 | 0.194 | 0.0876 | 0.0309 | 0.9812 |
| 680 | 0.0447 | 0.0767 | 0.7031 | 0.808 | 0.8057 | 0.074 | 0.9049 | 0.5715 | 0.3479 | 0.1933 | 0.0877 | 0.0306 | 0.9625 |
| 685 | 0.0448 | 0.0783 | 0.7011 | 0.813 | 0.8054 | 0.0731 | 0.898 | 0.5703 | 0.3456 | 0.1933 | 0.087 | 0.0312 | 0.9054 |
| 690 | 0.0451 | 0.0798 | 0.7044 | 0.8132 | 0.8113 | 0.0724 | 0.8995 | 0.5712 | 0.3463 | 0.1923 | 0.0871 | 0.031 | 0.8483 |
| 695 | 0.0456 | 0.0823 | 0.7079 | 0.8177 | 0.8113 | 0.0716 | 0.902 | 0.5702 | 0.3452 | 0.1919 | 0.087 | 0.032 | 0.8688 |
| 700 | 0.0463 | 0.0847 | 0.7119 | 0.8166 | 0.8155 | 0.0708 | 0.9028 | 0.5681 | 0.3443 | 0.1904 | 0.0869 | 0.0317 | 0.8894 |
| 705 | 0.0474 | 0.0869 | 0.7106 | 0.8186 | 0.823 | 0.0696 | 0.9024 | 0.5687 | 0.3432 | 0.1918 | 0.0871 | 0.0324 | 0.8956 |
| 710 | 0.0489 | 0.0889 | 0.7129 | 0.8173 | 0.8234 | 0.0697 | 0.9016 | 0.5642 | 0.3429 | 0.192 | 0.0869 | 0.032 | 0.9018 |
| 715 | 0.0494 | 0.0892 | 0.7143 | 0.8224 | 0.8271 | 0.0693 | 0.9041 | 0.5647 | 0.3409 | 0.1906 | 0.0859 | 0.0323 | 0.824 |
| 720 | 0.0506 | 0.0891 | 0.7165 | 0.8238 | 0.8306 | 0.0703 | 0.9066 | 0.566 | 0.3407 | 0.1898 | 0.0863 | 0.0324 | 0.7461 |
| 725 | 0.0536 | 0.0889 | 0.7168 | 0.8274 | 0.8371 | 0.0735 | 0.9068 | 0.5665 | 0.341 | 0.1896 | 0.0861 | 0.0325 | 0.793 |
| 730 | 0.056 | 0.0871 | 0.7201 | 0.8249 | 0.8414 | 0.0767 | 0.8987 | 0.5631 | 0.3406 | 0.1905 | 0.0855 | 0.0328 | 0.8399 |
| 735 | 0.0582 | 0.0877 | 0.7185 | 0.8268 | 0.8402 | 0.0819 | 0.9005 | 0.5631 | 0.3389 | 0.1893 | 0.0854 | 0.0333 | 0.8693 |
| 740 | 0.0622 | 0.0893 | 0.7188 | 0.8325 | 0.8457 | 0.0889 | 0.9016 | 0.5618 | 0.3365 | 0.1892 | 0.0855 | 0.0331 | 0.8988 |
| 745 | 0.0704 | 0.092 | 0.7206 | 0.8397 | 0.8551 | 0.1006 | 0.907 | 0.5638 | 0.337 | 0.1887 | 0.0858 | 0.0335 | 0.8291 |
| 750 | 0.0802 | 0.0957 | 0.7264 | 0.8356 | 0.8614 | 0.1169 | 0.9066 | 0.5631 | 0.3374 | 0.1881 | 0.0857 | 0.0335 | 0.7595 |

TABLE 2

CIE 1976 CIELAB values and a,b chroma and hue angle, referring to CIE Standard Illuminant D50, of the patches of the Macbeth Color Checker Chart used in testing.

|  | L* | a* | b* | $C^*_{ab}$ | $h_{ab}$ |
| --- | --- | --- | --- | --- | --- |
| dark skin | 37.297 | 14.5179 | 15.3613 | 21.1362 | 46.6168 |
| light skin | 66.4792 | 16.6964 | 17.2205 | 23.9858 | 45.8853 |
| blue sky | 50.4873 | −5.1851 | −22.1537 | 22.7524 | 256.827 |
| foliage | 42.8725 | −13.5891 | 22.0558 | 25.906 | 121.6381 |
| blue flower | 56.3265 | 8.469 | −25.4254 | 26.7988 | 288.4225 |
| blueish green | 71.3796 | −32.581 | 0.8015 | 32.5909 | 178.5909 |
| orange | 61.9097 | 35.54 | 59.3904 | 69.2121 | 59.1031 |
| purplish blue | 39.9229 | 9.3015 | −43.7725 | 44.7498 | 281.9967 |
| moderate red | 51.932 | 47.0787 | 15.474 | 49.5566 | 18.1948 |
| purple | 30.2374 | 22.2276 | −22.5683 | 31.6764 | 314.5642 |
| yellow green | 72.7068 | −22.4735 | 57.1065 | 61.3695 | 111.4814 |
| orange yellow | 72.3728 | 20.5452 | 67.7536 | 70.8002 | 73.1309 |
| Blue | 29.2171 | 16.1802 | −51.1352 | 53.634 | 287.5584 |
| Green | 55.3537 | −38.2105 | 33.9122 | 51.0889 | 138.4107 |
| Red | 41.3822 | 54.8705 | 26.3132 | 60.8536 | 25.6201 |
| Yellow | 82.0074 | 4.8501 | 79.388 | 79.536 | 86.504 |
| Magenta | 51.7415 | 48.0079 | −14.8653 | 50.2567 | 342.7952 |
| Cyan | 50.3764 | −29.4406 | −27.2852 | 40.1401 | 222.824 |
| white | 95.5258 | −0.4069 | 2.0886 | 2.1279 | 101.0248 |
| neutral 8 | 80.796 | 0.0544 | −0.112 | 0.1245 | 295.8809 |
| neutral 6.5 | 66.3999 | −0.1351 | 0.0419 | 0.1415 | 162.7723 |
| neutral 5 | 51.6319 | 0.3456 | 0.317 | 0.4689 | 42.5292 |
| neutral 3.5 | 35.8927 | 0.0934 | 0.4881 | 0.497 | 79.1645 |
| black | 19.5112 | 0.1518 | −0.0084 | 0.1521 | 356.8186 |

To determine whether a transforming process meets the color enhancement metric of the invention, one performs the following comparison between target and reproduced CIELAB values to find out if one or more of the following statements apply:

a) colors within a region of color space including the foliage patch of the Macbeth Color Checker are consistently and smoothly shifted towards higher hue angles, limited to a maximum hue angle rotation of 15 degrees, whereby, expressed in terms of CIELAB for CIE Standard Illuminant D50, the region is bounded by hue lines of 10–40 degrees below and above the hue angle, $h_{ab}$, of the foliage patch and includes colors that differ by at least 10 CIE 1976 a,b chroma and lightness units from the foliage patch;

b) colors within the region given in step a) above are consistently and smoothly moved towards a hue center between CIE 1976 a,b hue angles of 115 and 135;

c) colors within a region of color space including the blue sky patch of the Macbeth Color Checker are consistently and smoothly shifted towards higher hue angles, limited to a maximum hue angle rotation of 15 degrees, whereby, expressed in terms of CIELAB for CIE Standard Illuminant D50, the region is bounded by hue lines of 10–40 degrees below and above the hue angle of the blue sky patch and includes colors that differ by at least 10 CIE 1976 a,b chroma and lightness units from the blue sky patch;

d) colors with hues in the range given in step c) above consistently and smoothly moved towards a hue center between CIE 1976 a,b hue angles of 250 and 267;

e) colors within a region of color space including the yellow patch of the Macbeth Color Checker are consistently and smoothly shifted towards lower hue angles, limited to a maximum hue angle rotation of 10 degrees, whereby, expressed in terms of CIELAB for CIE Standard Illuminant D50, the region is bounded by hue lines of 10–20 degrees below and above the hue angle of the yellow patch and includes colors that differ by at least 10 CIE 1976 a,b chroma and lightness units from the yellow patch;

f) colors within a region of color space including the two skin tone patches of the Macbeth Color Checker are consistently and smoothly moved towards a hue angle, $h_{ab}$, between 40 and 50 degrees, whereby, expressed in terms of CIELAB for CIE Standard Illuminant D50, the region is bounded by hue lines of 10–30 degrees below and above the hue angles of the two skin tone patches and includes colors that differ by 10–30 CIE 1976 a,b chroma units and at least 10 lightness units from the two skin tone patches;

g) any local hue manipulations are performed where hues are consistently and smoothly moved towards a hue line or a whole section of color space is consistently and smoothly shifted in one direction, whereby, expressed in terms of CIELAB for CIE Standard Illuminant D50, the region affected covers a hue angle range of 10–60 degrees and includes colors that differ by at least 15 CIE 1976 a,b chroma and lightness values.

In addition, the following five statements must apply:

a) The image was captured on an image capture medium and/or device capable of capturing the scene parameters such that the CIE 1976 color differences, $\Delta E^*_{ab}$, between the original scene color and the digital representation of the scene color is on average below 5 with a maximum of 12 for the colors on the Macbeth Color Checker, and a maximum of 5 for the two skin tone patches.

b) The chroma values of the digital representation of the scene are scaled such that the CIE 1976 a,b chroma ratios of the reproduced image and the original scene for the two skin tones patches of the Macbeth Color Checker is less or equal than for the foliage and sky patches.

c) The scaling factor for the chroma of the patches of the Macbeth Color Checker excluding the neutral, skin, sky and foliage patches, is selected such that the ratio of the CIE 1976 a,b chroma of the reproduced patch and the original of at least one of these patches is at least as high as the higher of the chroma ratios of the foliage and sky patches, and that the chroma ratio of at least two of these patches at least as high as the maximum of the chroma ratios of the two skin tone patches.

d) The standard deviation of the CIE 1976 a,b chroma ratios of the reproduction and original of all color patches of the Macbeth Color Checker patches is below 0.4, excluding the neutral patches.

e) A tone scale transformation is applied, i.e. the reproduced CIE 1976 lightness, L*, of the patches is a smooth, monotonic function of the scene lightness values.

In addition, the following statement may apply:

The lightness of any region of color space was smoothly and consistently altered with a maximum CIE 1976 lightness difference of 3–10 compared with the result that would be obtained from the global tone scale transformation, whereby, expressed in terms of CIELAB for CIE Standard Illuminant D50, the region is bounded by hue lines of 10–40 degrees below and above the CIE 1976 a,b hue angle of any of the 11 high chroma patches of the Macbeth Color Checker and include colors that differ by at least 10 CIE 1976 a,b chroma and lightness units from the one of these patches.

Any of the regional statements about hue, lightness and chroma manipulations can be tested by placing a set of color correction filters (10R, 20R, 30R, 5G, 10G, 20G, 30G, 10B, 20B, 30B, 10C, 20C, 30C, 10M, 20M, 30M, 10Y, 20Y, 30Y) in front of the capture device. In this case the same transformation between the captured scene code values and the digital representation of the scene colors must be used as for the Macbeth Color Checker Chart captured without the filters. The calculation of XYZ aim values, including the filter spectrum, and reproduced XYZ values is carried out as described before. In this case, the color balance of the print must be the same as for the reproduction of the target without the filter. This way, a ring-around of colors around the original colors of the chart can be created, in order to test the remaining claims of the invention.

EXAMPLE 1

Figure 21:
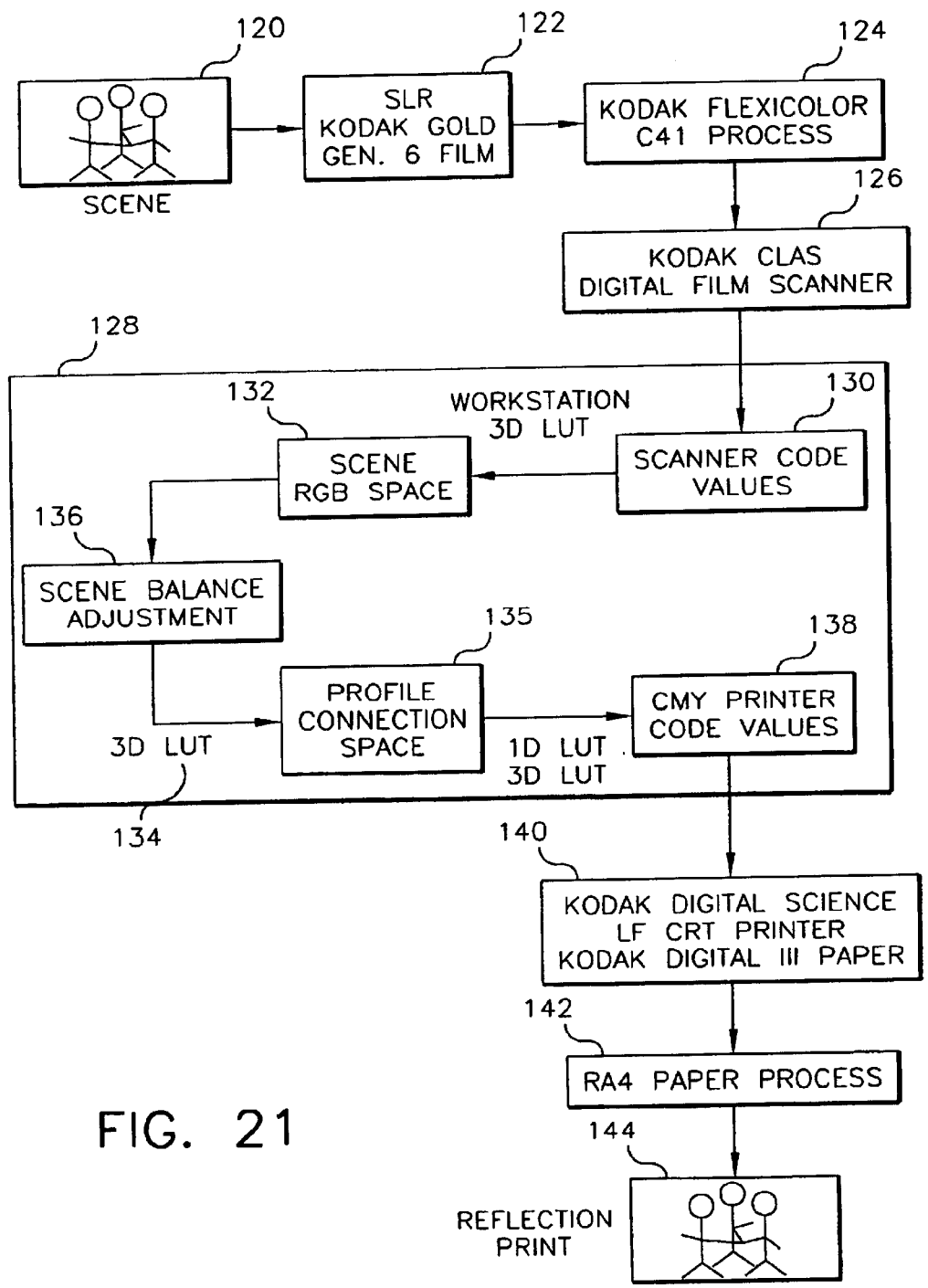
FIG. 21 is block diagram showing an example of image processing according to the present invention.

Referring to FIG. 21, an example of how reflection prints with preferred color reproduction can be produced from a color negative film according to the present invention will be described. A Scene 120 is captured 122 on Kodacolor Gold 400—Generation 6 film with a single lens reflex (SLR) camera (not shown). The film is exposed under average daylight illumination at average luminance levels in the order of 1600 cd/m². The film is developed 124 in the Kodak Flexicolor C41 process. The images are scanned 126 using a Kodak CLAS Digital Film Scanner and the scanner RGB code values are stored on the hard drive of a workstation 128, for example a Pentium III computer. The processing sequence consists of a concatenation of several one- and three-dimensional lookup tables and a scalar shift as follows.

1. The scanner code values 130 are mapped to large gamut RGB color space 132, that encompasses all colors that can be recorded on the color negative film. The data metric, $X_E$, of this space can be calculated from CIE XYZ values under CIE Standard Illuminant D50, X, Y, Z, using the following set of equations:

$$\begin{bmatrix} r_E \\ g_E \\ b_E \end{bmatrix} = 0.01 \cdot \begin{bmatrix} 1.3460 & -0.2556 & -0.0511 \\ -0.5446 & 1.5082 & 0.0205 \\ 0.0000 & 0.0000 & 1.0000 \end{bmatrix} \cdot \begin{bmatrix} X \\ Y \\ Z \end{bmatrix} \quad (1)$$

$$X_E = \begin{cases} 0 & x_E \leq 0 \\ I_{max} \dfrac{\log E_t - \log E_{min}}{\log E_{clip} - \log E_{min}} \dfrac{x_E}{E_t} & 0 < x_E \leq E_t \\ I_{max} \dfrac{\log x_E - \log E_{min}}{\log E_{clip} - \log E_{min}} & E_t < x_E \leq E_{clip} \\ I_{max} & x_E > E_{clip} \end{cases} \quad (2)$$

where $x_E$ denotes the $r_E$, $g_E$ or $b_E$ values calculated from Eq. 1, $I_{max}$=4096 integer units, $E_{clip}$=316.2, $E_{min}$=0.001, $E_t$=0.002718 and log is the logarithm to the base of 10. A 3D LUT 134 can be constructed from a large set of test exposures of known spectral distribution and exposure, that was developed in the Kodak Flexicolor C41 process and scanned on the same Kodak CLAS Digital Film Scanner likewise.

2. A scene balance algorithm 136 is applied to the image. The scene balance algorithm should ensure that the 20% gray of the scene is mapped to the equivalent output code value of 1713 integer units. If this criterion is met, the scene is perfectly balanced for color and lightness. Unfortunately, automatic scene balance algorithms never obtain a perfectly neutral balance of the scene according to the above requirement. The accuracy with the framework of this invention is sufficient if 95% of the scenes (daylight and electronic flash exposure) are balanced within a CIE 1976 a,b chroma difference of 5 from the aim and within a CIE 1976 L* difference of 5 from the aim. At this point we have a digital representation of the scene colors. Assuming CIE Standard D50 Illuminant and perfect neutral balance according to the above criterion, the average CIE 1976 color difference between the CIELAB values that are measured in the scene according to the procedure outlined in the Testing section and the digital representation of these colors is DE*ab=3.

3. A three-dimensional lookup table maps the scene exposures obtained from steps 1 and 2 to the preferred visual reproduction encoded in Profile Connection Space (PCS) 135. This transformation produces the following relation between the encoded scene exposures and the colorimetry of the reproduction, a reflective print on photographic paper intended for viewing in an average indoor environment with average luminance levels in the order of 100 cd/m² with viewing flare of 0.5%. The transformation is expressed as the relation between scene CIELAB values and CIELAB values of the reproduction referring to CIE Standard D50 Illuminant:

(a) The foliage patch of the Macbeth Color Checker chart was moved to a CIE 1976 a,b hue angle of 125 degrees. Scene colors within a CIE 1976 a,b chroma distance of 20 and a L* difference of 20 are consistently and smoothly moved to a CIE 1976 a,b hue angle of 127 degrees.

(b) Scene colors within a CIE 1976 a,b chroma distance of 20 and a L* difference of 20 from the color from the sky patch of the Macbeth Color Checker chart are consistently and smoothly moved to a CIE 1976 a,b hue angle of 256 degrees.

(c) Scene colors within a CIE 1976 a,b chroma distance of 20 and a L* difference of 30 from the color from the light skin tone patch of the Macbeth Color Checker chart are consistently and smoothly moved to a CIE 1976 a,b hue angle of 47 degrees.

(d) Scene colors within a CIE 1976 a,b hue angle difference of 10 degrees and a L* difference of 30 from the color yellow patch of the Macbeth Color Checker chart are consistently and smoothly shifted to a lower CIELAB hue angle with a maximum shift of 5 degrees.

(e) The CIE 1976 a,b chroma values of colors within a CIE 1976 chroma distance of the 10 from the neutral point (a*=b*=0) are scaled by a factor of 1.2.

(f) The CIE 1976 chroma a,b values of scene colors within a CIE 1976 a,b chroma distance of the 15 and L* distance of 30 from the light and dark skin tone patches of the Macbeth Color Checker chart are scaled by a factor of 1.25.

(g) Other scene colors with CIE 1976 a,b chroma values above 20 are scaled by a factor of 1.4. The hue and chroma mappings are shown in FIG. 19.

(h) The lightness of scene colors within a CIE 1976 a,b chroma distance of 25 and a lightness distance of 30 from the red patch of the Macbeth Color Checker Chart were consistently and smoothly decreased by a maximum of 4 CIE 1976 L* units.

(i) A global tone scale was applied. This tone scale modifies the lightness of the neutral patches of the Macbeth Color Checker chart as shown in FIG. 20. A 100% white diffuser under the given illuminant in the scene or the reproduction would correspond to L*=100.

Figure 22:
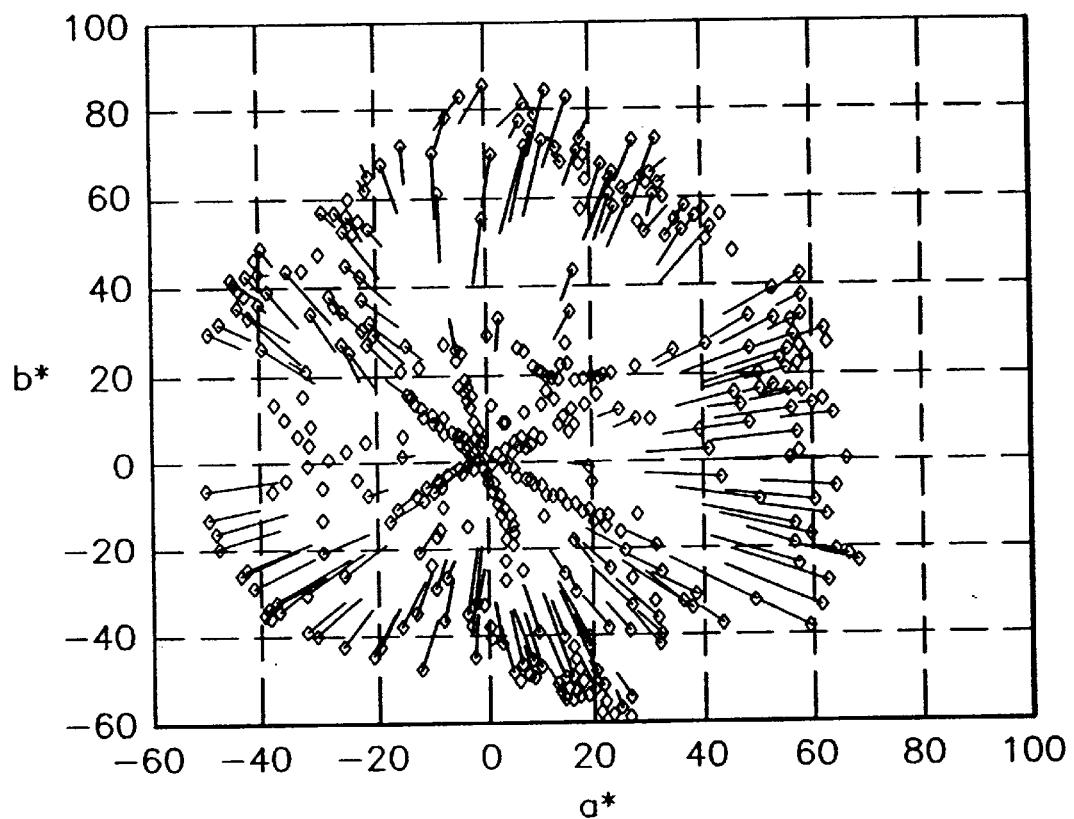
FIG. 22 is a plot showing hue and chroma mapping for the example in FIG. 21.
Figure 23:
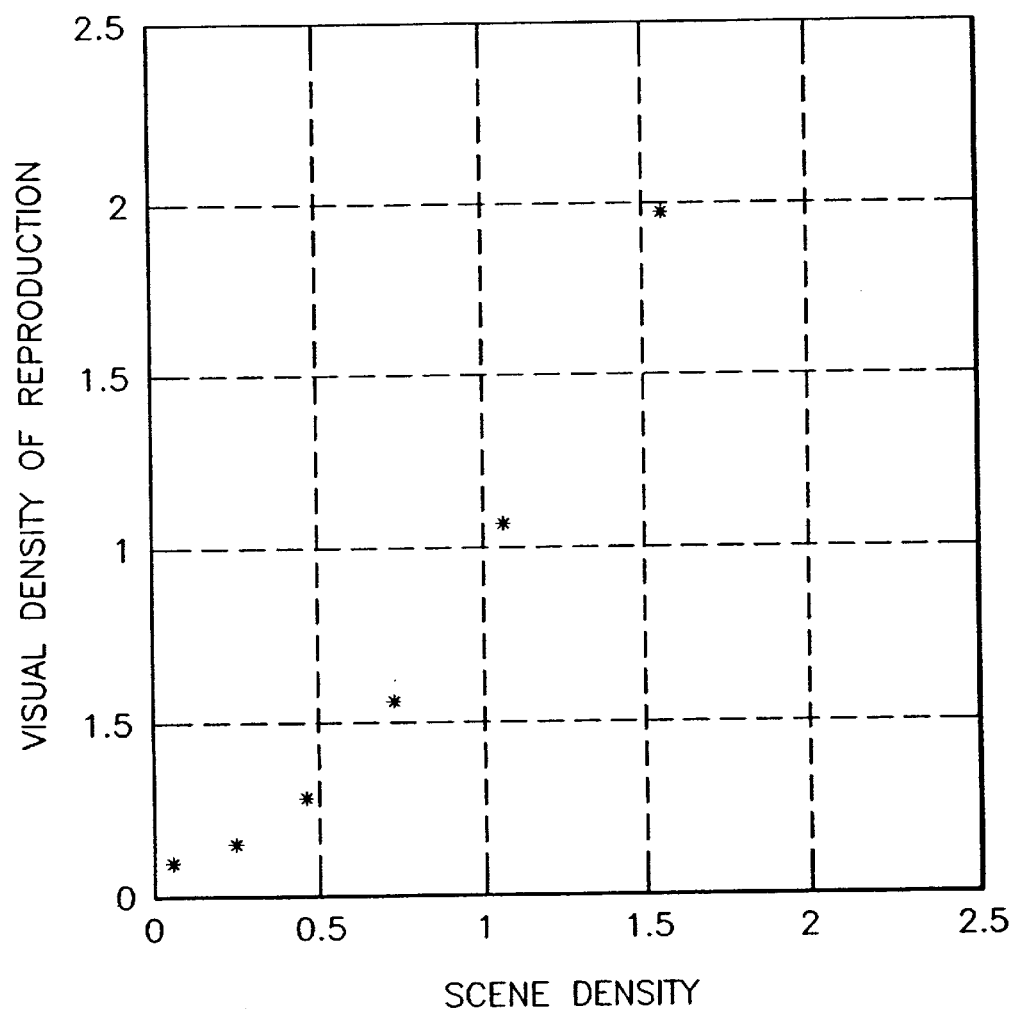
FIG. 23 is a plot showing reproduced lightness vs. scene lightness for the example in FIG. 22.

The hue and chroma mappings from scene colors to reproduced colors listed in items (a)–(g) are shown in FIG. 22 in form of a CIELAB plot. The heads of the arrows (symbols) correspond to the reproduced color. FIG. 23 shows how the scene densities of neutral patches of the Macbeth Color Checker chart are mapped to visual densities of the reproduction according to the global tonescale mentioned in item (i).

1. The PCS data are transformed to printer code values 138 that produce the desired visual reproduction as specified in PCS. This is accomplished by a combination of a one-dimensional and three-dimensional LUT. This transformation also performs gamut mapping, using a method that maintains the CIELAB D50 hue angle. The device code values drive a Kodak Digital Science LF CRT printer loaded with Kodak Digital III silver halide paper 140. The paper is processed in the RA4 process 142 to produce a visual reproduction of the scene 144 as specified in the invention. Eighty percent of the images generated as described in the example were preferred over the images generated by a current silver halide color film/paper system in a paired comparison.

EXAMPLE 2

Figure 24:
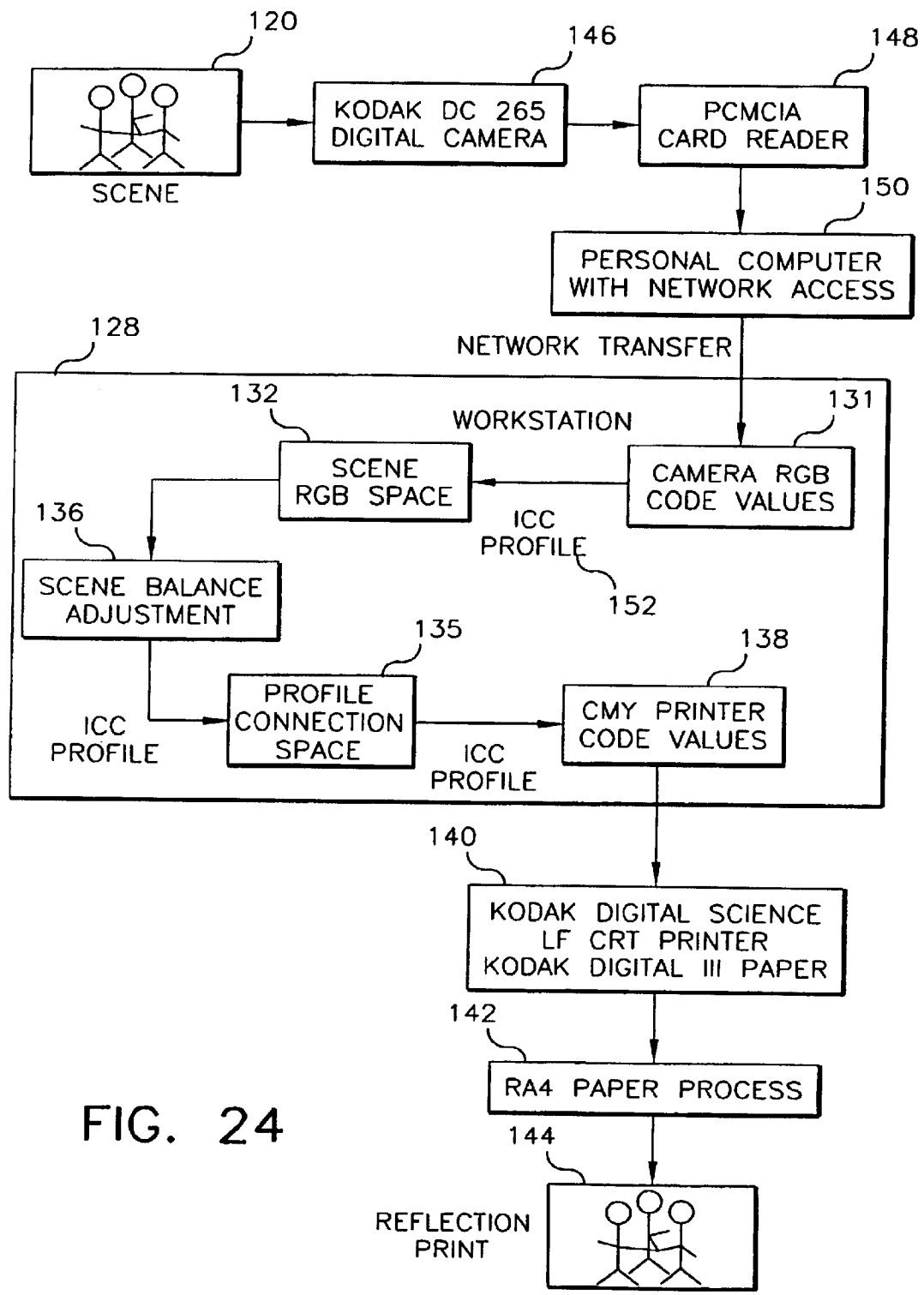
FIG. 24 is block diagram showing an example of image processing according to the present invention.

Referring to FIG. 24, an example of how reflection prints with preferred color reproduction can be produced from a digital camera according to the present invention will be described. A scene 120 is captured using the Kodak DC 265 digital camera 146. The camera is equipped with a PCMCIA card for image storage. The image is uploaded to a personal computer 150 using a PCMCIA card reader 148. The computer has access to a network, e.g. the Worldwide Web, so that the images can be transmitted to workstation 128 for further processing. The Kodak Photonet Online service can be used for this transaction. The image RGB values 131 are converted to scene color RGB values 132, as defined in Equations 1 and 2 of Example 1. This transformation is implemented as an ICC profile 152. Preferred color manipulations and output operations were performed as in example 1 except that the conversion from balanced scene color RGB to PCS 135 and from PCS to CMY printer code values 138 was implemented in the form of profiles 152.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described in detail with particular reference to certain preferred embodiments thereof, but it will be understood that variations and modifications can be effected within the spirit and scope of the invention. For example, the hue and lightness transformations and chroma scaling can be implemented using one or more of the following to effect the transformation from one color space to another: matrices, polynomials, analytical functions, shift and scale factors, and/or N-dimensional lookup tables. These mathematical operations can also be performed by a series of ICC profiles. In addition, hue and lightness transformations and chroma scaling can be performed in any order, and several of the desired manipulations can be performed in one step, e.g. lightness transformation and chroma scaling could be combined in the application of a tonescale.

PARTS LIST

- 10 capture scene parameters step
- 12 transform scene parameters step
- 14 create visual reproduction step
- 16 expose and process film step
- 18 digitize images step
- 20 store images step
- 22 process images step
- 24 archive images step
- 26 display images step
- 28 reflection print
- 30 capture digital image step
- 32 store scene parameters step
- 34 read scene parameters step
- 36 process scene parameters step
- 38 display image step
- 40 reflection print
- 42 skin tone patches
- 44 hue angle
- 46 hue line
- 48 color space region
- 50 centroid color
- 52 chroma difference
- 53 hue angle range
- 54 hue line
- 56 foliage sector of color space
- 58 blue sky sector of color space
- 60 skin tone sector of color space
- 62 yellow hues
- 64 tone scale
- 66 tone scale
- 68 tone scale
- 70 tone scale
- 100 test target
- 102 test target
- 103 lighting system
- 104 imaging system
- 106 scene capture apparatus
- 108 transformation step
- 110 image reproduction
- 112 reproduction of target 102
- 114 reproduction of target 100
- 116 low flare radiometer
- 120 scene
- 122 scene capture step
- 124 develop film step
- 126 scan images step
- 128 workstation
- 130 code values
- 132 RGB color space
- 134 3D LUT
- 135 Profile Connection Space (PCS)
- 136 scene balance algorithm
- 138 printer code values
- 140 silver halide paper
- 142 RA4 process
- 144 visual reproduction
- 146 digital camera
- 148 PCMCIA card reader
- 150 personal computer
- 152 ICC profile
- 154 light source
- 156 test target
- 158 capture and processing step
- 160 trichromatic scanner
- 161 scene balance algorithm
- 162 data set of scanner code values -continued

| | |
|---|---|
| 164 | one dimensional lookup table |
| 166 | pixel value |
| 168 | digital printer |
| 170 | print |
| 172 | spectrophotometer |
| 174 | reproduction |
| 176 | telespectroradiometer |
| 178 | illuminated target |
| 180 | reproduced test colors |
| 182 | chosen printer code values |
| 184 | printing step |
| 186 | reproduction |
| 188 | spectrophotometer |
| 190 | reproduction |
| 192 | transformation |
| 194 | printer code values |
| 196 | inverse transformation |
| 200 | transformation |

What is claimed is:

1. A method for forming a transform for processing digital color images, said digital color images having pixel values from which digital lightness, chroma, and hue values can be deduced, comprising the steps of:
   a) specifying one or more regions of color space in which digital hue values will be transformed;
   b) selecting one or more test colors within each specified region of color space for which preferred digital hue values are to be defined;
   c) deducing original digital hue values for the test colors;
   d) determining preferred digital hue values for the test colors; and
   e) forming a transform that alters the original digital hue values in a manner that moves said values consistently, such that more than 80% of the colors within the specified region of color space show the expected behavior, and moves ssaid values smoothly, such that the hue angle shift that colors experience as a function of hue angle is a continuous function with CIE 1976 a,b hue angle shifts below 0.5 at the outer boundary of the region, toward or away from the preferred digital hue values.

2. The method claimed in claim 1, further comprising the step of applying the transform to a digital color image.

3. A computer storage medium having instructions stored thereon for causing a computer to perform the method of claim 2.

4. A computer storage medium having instructions stored thereon for causing a computer to perform the method of claim 1.

5. A method for forming a transform for processing digital color images, said digital color images having pixel values from which digital lightness, chroma, and hue values can be deduced, comprising the steps of:
   a) specifying one or more regions of color space in which digital hue values will be transformed;
   b) selecting one or more test colors within each specified region of color space for which preferred digital hue values are to be defined;
   c) deducing original digital hue values for the test colors;
   d) determining preferred digital hue values for the test colors; and
   e) forming a transform that alters the original digital hue values in a manner that moves the hue values consistently, such that more than 80% of the colors within the specified region of color space show the expected behavior, and moves the hue values smoothly, such that the hue angle shift that colors experience as a function of hue angle is a continuous function with CIE 1976 a,b hue angle shifts below 0.5 at the outer boundary of the region, in a predetermined region of color space to avoid predetermined objectionable colors.

6. The method claimed in claim 5, further comprising the step of applying the transform to a digital color image.

7. A computer storage medium having instructions stored thereon for causing a computer to perform the method of claim 6.

8. The method claimed in claim 5, further comprising the step of transforming the hue values by consistently and smoothly moving the hue values within a predetermined region of color space toward or away from hues of predetermined preferred colors.

9. The method claimed in claim 8, further comprising the step of applying the transform to a digital color image.

10. A computer storage medium having instructions stored thereon for causing a computer to perform the method of claim 9.

11. The method of claim 8, further comprising the steps of:
   a) specifying one or more regions of color space in which digital chroma values will be transformed;
   b) selecting one or more test colors within each specified region of color space for which preferred digital chroma values are to be defined;
   c) deducing original digital chroma values for the test colors;
   d) determining preferred digital chroma values for the test colors; and
   e) forming a transform that scales the original digital chroma values in a manner that the scale factors differ smoothly between the different predetermined regions of color space.

12. The method of claim 11, further comprising the step of applying the transform to a digital color image.

13. A computer storage medium having instructions stored thereon for causing a computer to perform the method of claim 12.

14. The method of claim 11, further comprising the step of modifying the lightness values according to a predetermined transform.

15. A computer storage medium having instructions stored thereon for causing a computer to perform the method of claim 14.

16. A computer storage medium having instructions stored thereon for causing a computer to perform the method of claim 11.

17. The method of claim 8, wherein the predetermined transform transforms the lightness values such that the reproduced lightness is a continuous function of the scene CIE 1976 a,b lightness, hue angle and chroma.

18. A computer storage medium having instructions stored thereon for causing a computer to perform the method of claim 17.

19. The method of claim 8, further comprising the step of modifying the lightness values according to a predetermined transform.

20. A computer storage medium having instructions stored thereon for causing a computer to perform the method of claim 19.

21. The method of claim 8 wherein the pixel values in the digital image represent colorimetric values of an original scene.

22. A computer storage medium having instructions stored thereon for causing a computer to perform the method of claim 21.

23. A computer storage medium having instructions stored thereon for causing a computer to perform the method of claim 8.

24. A computer storage medium having instructions stored thereon for causing a computer to perform the method of claim 5.

25. A method of automatically processing a digital image having lightness, chroma, and hue pixel values representing colorimetric values of an original scene, comprising the steps of:

a) transforming the hue values by shifting a predetermined region of the color space consistently, such that more than 80% of the colors within the specified region of color space show the expected behavior, and transforming the hue values by shifting a predetermined region of the color space smoothly, such that the hue angle shift that colors experience as a function of hue angle is a continuous function with CIE 1976 a,b hue angle shifts below 0.5, toward or away from hues of predetermined preferred colors, and/or consistently shifting a predetermined region of color space consistently, such that more than 80% of the colors within the specified region of color space show the expected behavior, and transforming the hue values by shifting a predetermined region of color space smoothly, such that the hue angle shift that colors experience as a function of hue angle is a continuous function with CIE 1976 a,b hue angle shifts below 0.5, to avoid predetermined objectionable colors;

b) scaling the chroma values depending on an intended output medium, whereby the scale factors differ smoothly between different predetermined regions of color space; and c) modifying the lightness values according to a predetermined transform.

26. The method of claim 25 wherein the colorimetric values are produced by the steps of:

a) exposing a photographic film to the original scene;

b) developing and scanning the film to produce a digital image; and c) transforming the digital image to a colorimetric digital scene representation.

27. A computer storage medium having instructions stored thereon for causing a computer to perform the method of claim 26.

28. The method of claim 25 wherein the colorimetric values are produced by the steps of:

a) capturing an image of the original scene with an electronic camera to produce a digital image; and b) transforming the digital image to a colorimetric digital scene representation.

29. A computer storage medium having instructions stored thereon for causing a computer to perform the method of claim 28.

30. The method of claim 25 further comprising the step of displaying the processed digital image such that a reproduction according to the desired visual reproduction parameters is obtained.

31. The method of claim 30, wherein the processed digital image is displayed on a monitor.

32. A computer storage medium having instructions stored thereon for causing a computer to perform the method of claim 31.

33. A computer storage medium having instructions stored thereon for causing a computer to perform the method of claim 30.

34. The method of claim 25 further comprising the steps of:

capturing an original scene parameter or exposure condition, and employing the captured parameter or condition to transform the digital image to the colorimetric digital scene.

35. The method of claim 34, further comprising the step of:

employing the captured parameter or condition to determine the lightness transformation and chroma scaling.

36. A computer storage medium having instructions stored thereon for causing a computer to perform the method of claim 25.

37. A method of automatically processing a digital image having lightness, chroma, and hue pixel values representing colorimetric values of an original scene, comprising the steps of:

a) transforming the hue values by consistently and smoothly moving hue values within a predetermined region of color space toward or away from hues of predetermined preferred colors, and/or consistently and smoothly shifting a predetermined region of color space to avoid predetermined objectionable colors;

b) scaling the chroma values depending on an intended output medium, whereby the scale factors differ smoothly between different predetermined regions of color space; and c) modifying the lightness values according to a predetermined transform; and further comprising the step of capturing the image on an image capture medium and/or device capable of capturing the scene parameters such that the CIE 1976 color differences, $\Delta E^*_{ab}$, between the original scene color and the digital representation of the scene color is on average below 5 with a maximum of 12 for the colors on the Macbeth Color Checker, and a maximum of 5 for the two skin tone patches.

38. The method of claim 37, wherein the step of transforming hue pixel values comprises one or more steps selected from the group of steps including:

a) shifting the hues of colors within a region of color space including the foliage patch of the Macbeth Color Checker consistently and smoothly towards higher hue angles, limited to a maximum hue angle rotation of 15 degrees, whereby, expressed in terms of CIELAB for CIE Standard Illuminant D50, the region is bounded by hue lines of 10–40 degrees below and above the hue angle, $h_{ab}$, of the foliage patch and includes colors that differ by at least 10 CIE 1976 a,b chroma and lightness units from the foliage patch;

b) moving colors within the region given in step a) above consistently and smoothly towards or away from a hue center between CIE 1976 a,b hue angles of 115 and 135 degrees;

c) shifting the hues of colors within a region of color space including the blue sky patch of the Macbeth Color Checker consistently and smoothly towards higher hue angles, limited to a maximum hue angle rotation of 15 degrees, whereby, expressed in terms of CIELAB for CIE Standard Illuminant D50, the region is bounded by hue lines of 10–40 degrees below and above the CIE 1976 a,b hue angle of the blue sky patch and includes colors that differ by at least 10 CIE 1976 a,b chroma and lightness units from the blue sky patch;

d) moving the hues of colors within the region given in step c) above consistently and smoothly towards or away from a hue center between CIE 1976 a,b hue angles of 250 and 267 degrees;

e) shifting colors within a region of color space including the yellow patch of the Macbeth Color Checker consistently and smoothly towards lower hue angles, limited to a maximum hue angle rotation of 10 degrees, whereby, expressed in terms of CIELAB for CIE Standard Illuminant D50, the region is bounded by hue lines of 10–20 degrees below and above the CIE 1976 a,b hue angle of the yellow patch and includes colors that differ by at least 10 CIE 1976 a,b chroma and lightness units from the yellow patch;

f) moving colors within a region of color space including the two skin tone patches of the Macbeth Color Checker consistently and smoothly towards a hue angle between 40 and 50 degrees, whereby, expressed in terms of CIELAB for CIE Standard Illuminant D50, the region is bounded by hue lines of 10–30 degrees below and above the CIE 1976 a,b hue angles of the two skin tone patches and includes colors that differ by 10–30 CIE 1976 a,b chroma units and at least 10 CIE 1976 lightness units from the two skin tone patches; and g) any local hue manipulations where hues are consistently and smoothly moved toward or away from a hue line or a whole section of color space is consistently and smoothly shifted in one direction, whereby, expressed in terms of CIELAB for CIE Standard Illuminant D50, the region affected includes colors that differ by 10–60 degrees in the CIE 1976 a,b hue angle dimension and by at least 15 CIE 1976 a,b chroma and lightness, L*, values.

39. A computer storage medium having instructions stored thereon for causing a computer to perform the method of claim 38.

40. A computer storage medium having instructions stored thereon for causing a computer to perform the method of claim 37.

41. The method of claim 37 wherein the colorimetric values are produced by the steps of:
a) exposing a photographic film to the original scene;
b) developing and scanning the film to produce a digital image; and
c) transforming the digital image to a colorimetric digital scene representation.

42. The method of claim 37 wherein the colorimetric values are produced by the steps of:
a) capturing an image of the original scene with an electronic camera to produce a digital image; and
b) transforming the digital image to a colorimetric digital scene representation.

43. A method of automatically processing a digital image having lightness, chroma, and hue pixel values representing colorimetric values of an original scene, comprising the steps of:
a) transforming the hue values by consistently and smoothly moving hue values within a predetermined region of color space toward or away from hues of predetermined preferred colors, and/or consistently and smoothly shifting a predetermined region of color space to avoid predetermined objectionable colors;
b) scaling the chroma values depending on an intended output medium, whereby the scale factors differ smoothly between different predetermined regions of color space; and c) modifying the lightness values according to a predetermined transform; and wherein the step of scaling chroma pixel values comprises one or more steps selected from the group of steps including:
a) scaling the chroma values of the digital representation of the scene such that the CIE 1976 a,b chroma ratios of the reproduced image and the original scene for the two skin tones patches of the Macbeth Color Checker is less than or equal to for the foliage and sky patches;
b) selecting the scaling factor for the chroma of the patches of the Macbeth Color Checker excluding the neutral, skin, sky and foliage patches, such that the ratio of the CIE 1976 a,b chroma of the reproduced patch and the original of at least one of these patches is at least as high as the higher of the chroma ratios of the foliage and sky patches, and that the chroma ratio of at least two of these patches is at least as high as the maximum of the chroma ratios of the two skin tone patches;
c) keeping the standard deviation of the CIE 1976 a,b chroma ratios of the reproduction and original of all color patches of the Macbeth Color Checker patches below 0.4, excluding the neutral patches; and
d) performing chroma scaling such that the reproduced chroma varies smoothly in the sense of being a continuous function of CIE 1976 lightness, chroma and hue angle.

44. A computer storage medium having instructions stored thereon for causing a computer to perform the method of claim 43.

45. A method of automatically processing a digital image having lightness, chroma, and hue pixel values representing colorimetric values of an original scene, comprising the steps of:
a) transforming the hue values by consistently and smoothly moving hue values within a predetermined region of color space toward or away from hues of predetermined preferred colors, and/or consistently and smoothly shifting a predetermined region of color space to avoid predetermined objectionable colors;
b) scaling the chroma values depending on an intended output medium whereby the scale factors differ smoothly between different predetermined regions of color space; and
c) modifying the lightness values according to a predetermined transform; and wherein the step of transforming lightness values comprises one or more steps selected from the group of steps including:
a) applying a scene-dependent tone scale transformation;
b) applying a global scene-independent tone scale transformation;
c) applying a global scene-dependent or scene-independent tone scale transformation and altering the lightness of any region of color space smoothly and consistently with a maximum CIE 1976 lightness difference of 3–10 compared with the result that would be obtained from the global tone scale transformation, whereby, expressed in terms of CIELAB for CIE Standard Illuminant D50, the region is bounded by hue lines of 10–40 degrees below and above the CIE 1976 a,b hue angle of any of the non-neutral patches of the Macbeth Color Checker and include colors that differ by at least 10 CIE 1976 a,b chroma and lightness units from the one of these patches; and d) all lightness transformations are performed such that the reproduced lightness is a continuous function of the scene CIE 1976 a,b lightness, hue angle and chroma.

46. A computer storage medium having instructions stored thereon for causing a computer to perform the method of claim 45.

47. A method of automatically processing a digital image having lightness, chroma, and hue pixel values representing colorimetric values of an original scene. comprising the steps of:

transforming the hue values by consistently and smoothly moving hue values within a predetermined region of color space toward or away from hues of predetermined preferred colors, and/or consistently and smoothly shifting a predetermined region of color space to avoid predetermined objectionable colors;

scaling the chroma values depending on an intended output medium, whereby the scale factors differ smoothly between different predetermined regions of color space; and modifying the lightness values according to a predetermined transform; and wherein the colorimetric values are produced by the steps of:

exposing a photographic film to the original scene;

developing and scanning the film to produce a digital image; and transforming the digital image to a colorimetric digital scene representation; and further comprising the step of: capturing an original scene parameter or exposure condition, and employing the captured parameter or condition to transform the digital image to the colorimetric digital scene.

48. The method of claim 47, further comprising the step of:

employing the captured parameter or condition to determine the lightness transformation and chroma scaling.

49. A computer storage medium having instructions stored thereon for causing a computer to perform the method of claim 48.

50. The method of claim 47, wherein the processed digital image is used to create a reflection print.

51. A computer storage medium having instructions stored thereon for causing a computer to perform the method of claim 50.

52. A computer storage medium having instructions stored thereon for causing a computer to perform the method of claim 47.

53. The method of claim 47 wherein said original scene parameter or exposure condition is one or more of: contrast range, light source, exposure time, average scene luminance, camera flash status, and zoom lens status.

54. A method of automatically processing a digital image having lightness, chroma, and hue pixel values representing colorimetric values of an original scene, comprising the steps of:

a) transforming the hue values by consistently and smoothly moving hue values within a predetermined region of color space toward or away from hues of predetermined preferred colors, and/or consistently and smoothly shifting a predetermined region of color space to avoid predetermined objectionable colors;

b) scaling the chroma values depending on an intended output medium, whereby the scale factors differ smoothly between different predetermined regions of color space; and c) modifying the lightness values according to a predetermined transform;

whereby a scene balance algorithm is applied within the image processing sequence, such that 95% of scenes are balanced within a CIE 1976 a,b chroma difference of below 5 for the neutral patches of the Macbeth Color Checker Chart, and the CIE 1976 lightness difference does not exceed 5 for these neutral patches, compared with the lightness aims that are obtained from the predetermined transform between scene and reproduced lightness.

55. A computer storage medium having instructions stored thereon for causing a computer to perform the method of claim 54.

56. A digital image processing method comprising the steps of:

capturing a digital image of an original scene, said digital image having lightness, chroma, and hue pixel values representing colorimetric values of the original scene;

transforming the hue values by shifting a predetermined region of the color space consistently, such that more than 80% of the colors within the specified region of color space show the expected behavior, and transforming the hue values by shifting a predetermined region of the color space smoothly, such that the hue angle shift that colors experience as a function of hue angle is a continuous function with CIE 1976 a,b hue angle shifts below 0.5, toward or away from hues of predetermined preferred colors, and/or consistently shifting a predetermined region of color space consistently, such that more than 80% of the colors within the specified region of color space show the expected behavior, and transforming the hue values by shifting a predetermined region of the color space smoothly, such that the hue angle shift that colors experience as a function of hue angle is a continuous function with CIE 1976 a,b hue angle shifts below 0.5, to avoid predetermined objectionable colors;

scaling the chroma values depending on an intended output medium, whereby the scale factors differ smoothly between different predetermined regions of color space; and modifying the lightness values according to a predetermined transform; and further comprising the steps of:

capturing an original scene parameter or exposure condition; and employing the captured parameter or condition to transform the digital image to a colorimetric digital scene.

57. The method of claim 56 wherein said original scene parameter or exposure condition is one or more of: contrast range, light source, exposure time, average scene luminance, camera flash status, and zoom lens status.

58. A digital image processing method comprising the steps of:

exposing a photographic film to an original scene;

developing and scanning the film to produce a digital image, said digital image having lightness, chroma, and hue pixel values representing colorimetric values of the original scene;

transforming the hue values by shifting a predetermined region of the color space consistently, such that more than 80% of the colors within the specified region of color space show the expected behavior, and transforming the hue values by shifting a predetermined region of the color space smoothly, such that the hue angle shift that colors experience as a function of hue angle is a continuous function with CIE 1976 a,b hue angle shifts below 0.5, toward or away from hues of predetermined preferred colors, and/or consistently shifting a predetermined region of color space consistently, such that more than 80% of the colors within the specified region of color space show the expected behavior, and transforming the hue values by shifting a predetermined region of the color space smoothly, such that the hue angle shift that colors experience as a function of hue angle is a continuous function with CIE 1976 a,b hue angle shifts below 0.5, to avoid predetermined objectionable colors;

scaling the chroma values depending on an intended output medium, whereby the scale factors differ smoothly between different predetermined regions of color space; and modifying the lightness values according to a predetermined transform;

further comprising the steps of:

capturing an original scene parameter or exposure condition; and employing the captured parameter or condition in at least one of said transforming, scaling and modifying to transform the digital image to the colorimetric digital scene.

59. The method of claim 58 wherein said original scene parameter or exposure condition is one or more of: contrast range, light source, exposure time, average scene luminance, camera flash status, and zoom lens status.

* * * * *